United States Patent
Sherman et al.

(10) Patent No.: US 11,403,173 B2
(45) Date of Patent: Aug. 2, 2022

(54) MULTIPLE READ AND WRITE PORT MEMORY

(71) Applicant: Marvell Israel (M.I.S.L) Ltd., Yokneam (IL)

(72) Inventors: Roi Sherman, Yokneam (IL); Dror Bromberg, Michmoret (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 39 days.

(21) Appl. No.: 15/693,221

(22) Filed: Aug. 31, 2017

(65) Prior Publication Data
US 2017/0364408 A1    Dec. 21, 2017

Related U.S. Application Data

(63) Continuation-in-part of application No. 15/143,200, filed on Apr. 29, 2016, now Pat. No. 10,387,322.
(Continued)

(51) Int. Cl.
*G06F 11/10* (2006.01)
*G06F 3/06* (2006.01)
(Continued)

(52) U.S. Cl.
CPC .......... *G06F 11/1076* (2013.01); *G06F 3/064* (2013.01); *G06F 3/0619* (2013.01);
(Continued)

(58) Field of Classification Search
CPC .......... G06F 13/4022; G06F 2212/604; G06F 12/0284; G06F 12/0292; G06F 12/0813;
(Continued)

(56) References Cited

U.S. PATENT DOCUMENTS

| | | |
|---|---|---|
| 4,870,643 A | 9/1989 | Bultman et al. |
| 5,414,455 A | 5/1995 | Hooper et al. |

(Continued)

FOREIGN PATENT DOCUMENTS

| | | |
|---|---|---|
| CN | 103314363 A | 9/2013 |
| CN | 103729260 A | 4/2014 |

(Continued)

OTHER PUBLICATIONS

International Search Report and Written Opinion in International Application No. PCT/IB2016/00673, dated Oct. 5, 2016 (11 pages).
(Continued)

*Primary Examiner* — David Yi
*Assistant Examiner* — Zubair Ahmed

(57) ABSTRACT

A memory device includes content banks configured to store content data and parity banks configured to store parity data for reconstructing the content data. In response to receiving, in a first clock cycle, a first request requesting a first operation to be performed in a first content bank and a second request requesting to write new content data to the first content bank, the memory device performs the first operation in the first content bank, and writes the new content data to a second content bank. The second content bank is selected from a subset of content banks defined by content banks that correspond with parity banks different from parity banks that correspond with the first content bank. The memory device updates, based on the new content data written to the second content bank, parity data in the parity banks that correspond with the second content bank.

23 Claims, 14 Drawing Sheets

Related U.S. Application Data

(60) Provisional application No. 62/384,259, filed on Sep. 7, 2016, provisional application No. 62/159,482, filed on May 11, 2015, provisional application No. 62/158,708, filed on May 8, 2015, provisional application No. 62/158,703, filed on May 8, 2015, provisional application No. 62/157,716, filed on May 6, 2015, provisional application No. 62/157,707, filed on May 6, 2015, provisional application No. 62/156,693, filed on May 4, 2015, provisional application No. 62/155,683, filed on May 1, 2015, provisional application No. 62/154,793, filed on Apr. 30, 2015, provisional application No. 62/154,797, filed on Apr. 30, 2015.

(51) Int. Cl.
*G06F 13/40* (2006.01)
*G06F 12/02* (2006.01)
*G06F 13/16* (2006.01)
*G06F 12/0813* (2016.01)

(52) U.S. Cl.
CPC .......... *G06F 3/0644* (2013.01); *G06F 3/0673* (2013.01); *G06F 12/0284* (2013.01); *G06F 12/0292* (2013.01); *G06F 13/1663* (2013.01); *G06F 13/4022* (2013.01); *G06F 12/0813* (2013.01); *G06F 2212/1016* (2013.01); *G06F 2212/403* (2013.01); *G06F 2212/604* (2013.01); *G06F 2212/7208* (2013.01)

(58) Field of Classification Search
CPC ......... G06F 2212/1016; G06F 13/1663; G06F 2212/7208; G06F 11/1076; G06F 3/0619; G06F 3/064; G06F 3/0644; G06F 3/0673; G06F 2212/403
USPC .................................................. 711/123, 119
See application file for complete search history.

(56) References Cited

U.S. PATENT DOCUMENTS

| | | | |
|---|---|---|---|
| 5,508,732 A | 4/1996 | Bottomley et al. | |
| 5,581,479 A | 12/1996 | McLaughlin et al. | |
| 5,621,882 A | 4/1997 | Kakuta | |
| 5,636,139 A | 6/1997 | McLaughlin et al. | |
| 5,893,919 A | 4/1999 | Sarkozy et al. | |
| 6,115,323 A * | 9/2000 | Hashimoto | G11C 8/12 365/230.06 |
| 6,397,324 B1 | 5/2002 | Barry et al. | |
| 7,437,472 B2 | 10/2008 | Rose | |
| 7,451,467 B2 | 11/2008 | Carver et al. | |
| 7,934,120 B2 * | 4/2011 | Zohar | G06F 11/1076 711/114 |
| 8,358,651 B1 | 1/2013 | Kadosh et al. | |
| 8,402,217 B2 | 3/2013 | Burd | |
| 8,514,651 B2 * | 8/2013 | Levy | G06F 13/16 365/185.09 |
| 8,514,654 B2 | 8/2013 | Yamada et al. | |
| 8,724,423 B1 * | 5/2014 | Zhou | G11C 7/1075 365/189.02 |
| 9,053,009 B2 | 6/2015 | Ho | |
| 9,766,978 B2 | 9/2017 | Kittner | |
| 2003/0046477 A1 | 3/2003 | Jeddeloh | |
| 2003/0120861 A1 | 6/2003 | Calle et al. | |
| 2003/0182491 A1 * | 9/2003 | Chudnovsky | G06F 12/0292 711/5 |
| 2004/0090840 A1 | 5/2004 | Lee et al. | |
| 2004/0107308 A1 | 6/2004 | Andreev et al. | |
| 2006/0181935 A1 * | 8/2006 | Choi | G11C 8/08 365/208 |
| 2006/0282588 A1 | 12/2006 | Proujansky-Bell | |
| 2011/0047439 A1 | 2/2011 | Jorda et al. | |
| 2011/0258362 A1 * | 10/2011 | McLaren | G06F 3/0611 711/5 |
| 2012/0127818 A1 | 5/2012 | Levy et al. | |
| 2012/0198310 A1 * | 8/2012 | Tran | H03K 19/0016 714/763 |
| 2013/0024613 A1 | 1/2013 | Benhase et al. | |
| 2013/0205183 A1 | 8/2013 | Fillingim et al. | |
| 2014/0258775 A1 | 9/2014 | Flynn et al. | |
| 2015/0106584 A1 * | 4/2015 | Iyer | G06F 12/06 711/203 |
| 2016/0162359 A1 | 6/2016 | Kittner | |
| 2016/0320989 A1 | 11/2016 | Bromberg et al. | |
| 2016/0321184 A1 | 11/2016 | Bromberg et al. | |
| 2016/0328158 A1 | 11/2016 | Bromberg et al. | |

FOREIGN PATENT DOCUMENTS

| | | |
|---|---|---|
| CN | 103827833 A | 5/2014 |
| WO | WO-2002/071230 | 9/2002 |
| WO | WO-2008/121306 A2 | 10/2008 |
| WO | WO-2010/071655 | 6/2010 |

OTHER PUBLICATIONS

Office Action in Chinese Patent Application No. 201680037020.3, dated Aug. 5, 2020, with English translation (6 pages).
Search Report in Chinese Patent Application No. 201680037020.3, mailed with Office Action dated Aug. 5, 2020 (3 pages).

\* cited by examiner

FIG. 3

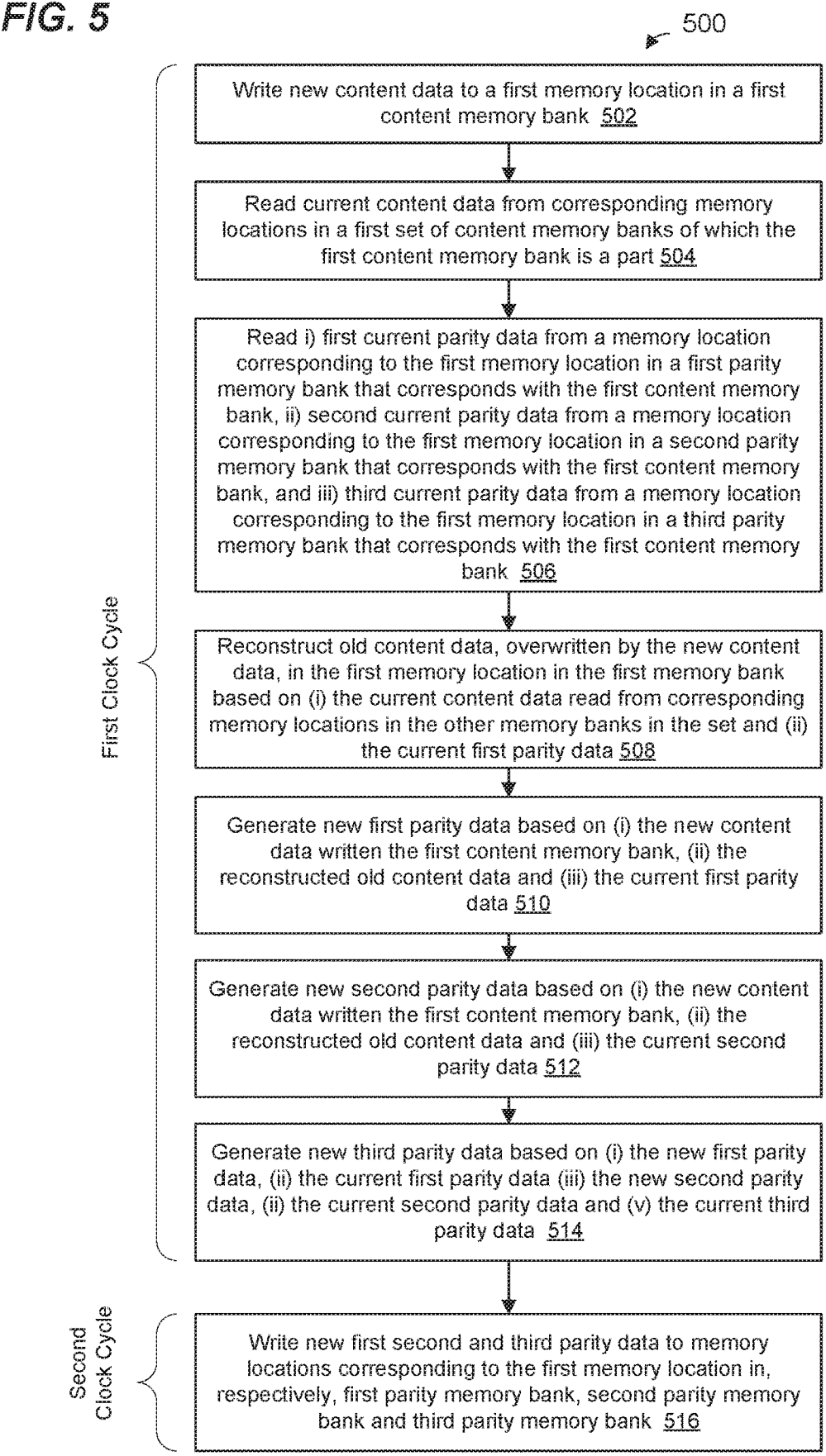

| PB col 616-1<br>CC1 – rd0<br>CC2 – wr0 | PB col 616-2<br>CC1 – rd1<br>CC2 – wr1 | PB col 616-3<br>CC1 – rd2<br>CC2 – wr2 | PB col 616-4<br>CC1 – rd3<br>CC2 – wr3 | PB cor 618<br>CC1 – rd0, rd1,<br>rd2, rd3<br>CC2 – wr0, wr1,<br>wr2, wr3 |
|---|---|---|---|---|
| MB 608-41 | MB 608-42 | MB 608-43 | MB 608-44<br>CC1 – rd3<br>CC2 – wr3 | PB row 614-4<br>CC1 – rd3<br>CC2 – wr3 |
| MB 608-31 | MB 608-32 | MB 608-33<br>CC1 – rd2<br>CC2 – wr2 | MB 608-34 | PB row 614-3<br>CC1 – rd2<br>CC2 – wr2 |
| MB 608-21 | MB 608-22<br>CC1 – rd1<br>CC2 – wr1 | MB 608-23 | MB 608-24 | PB row 614-2<br>CC1 – rd1<br>CC2 – wr1 |
| MB 608-11 | MB 608-12 | MB 608-13 | MB 608-14 | PB row 614-1<br>CC1 – rd0<br>CC2 – wr0 |

| | | | | |
|---|---|---|---|---|
| PB col 716-1 | PB col 716-2<br>CC1 – rd0<br>CC2 – wr0 | PB col 716-3<br>CC1 – rd1<br>CC2 – wr1 | PB col 716-4 | PB cor 718<br>CC1 – rd0, rd1<br>CC2 – wr0, wr1 |
| MB 708-41 | MB 708-42 | MB 708-43 | MB 708-44 | PB row 714-4 |
| MB 708-31<br>CC1 – rd1 | MB 708-32<br>CC1 – rd1 | MB 708-33<br>CC1 – wr1 | MB 708-34<br>CC1 – rd1 | PB row 714-3<br>CC1 – rd1<br>CC2 – wr1 |
| MB 708-21<br>CC1 – rd0 | MB 708-22<br>CC1 – wr0 | MB 708-23<br>CC1 – rd0 | MB 708-24<br>CC1 – rd0 | PB row 714-2<br>CC1 – rd0<br>CC2 – wr0 |
| MB 708-11<br>CC1 – rd2 | MB 708-12<br>CC1 – rd3 | MB 708-13<br>CC1 – rd3 | MB 708-14<br>CC1 – rd3 | PB row 714-1<br>CC1 – rd3 |

| | | | | |
|---|---|---|---|---|
| PB col 716-1 | PB col 716-2<br>CC1 – rd0<br>CC2 – wr0 | PB col 716-3<br>CC1 – rd1<br>CC2 – wr1 | PB col 716-4<br>CC1 – rd2<br>CC2 – wr2 | PB col 718<br>CC1 – rd0, rd1, rd2<br>CC1 – wr0, wr1, wr2 |
| MB 708-41<br>CC1 – rd2 | MB 708-42<br>CC1 – rd2 | MB 708-43<br>CC1 – wr1 | MB 708-44<br>CC1 – wr2 | PB row 714-4<br>CC1 – rd2<br>CC2 – wr2 |
| MB 708-31<br>CC1 – rd1 | MB 708-32<br>CC1 – rd1 | MB 708-33<br>CC1 – rd2 | MB 708-34<br>CC1 – rd1 | PB row 714-3<br>CC1 – rd1<br>CC2 – wr1 |
| MB 708-21<br>CC1 – rd0 | MB 708-22<br>CC1 – wr0 | MB 708-23<br>CC1 – rd0 | MB 708-24<br>CC1 – rd0 | PB row 714-2<br>CC1 – rd0<br>CC2 – wr0 |
| MB 708-11<br>CC1 – rd3 | MB 708-12 | MB 708-13 | MB 708-14 | PB row 714-1 |

| PB col 716-1<br>CC1 – rd0<br>CC2 – wr0 | PB col 716-2<br>CC1 – rd1<br>CC2 – wr1 | PB col 716-3<br>CC1 – rd2<br>CC2 – wr2 | PB col 716-4<br>CC1 – rd3<br>CC2 – wr3 | PB col 718<br>CC1 – rd0, rd1,<br>rd2, rd3<br>CC2 – wr0, wr1,<br>wr2, wr3 |
|---|---|---|---|---|
| MB 708-41<br>CC1 – rd3 | MB 708-42<br>CC1 – rd3 | MB 708-43<br>CC1 – rd3 | MB 708-44<br>CC1 – wr3 | PB row 714-4<br>CC1 – rd3<br>CC2 – wr3 |
| MB 708-31<br>CC1 – rd2 | MB 708-32<br>CC1 – rd2 | MB 708-33<br>CC1 – wr2 | MB 708-34<br>CC1 – rd2 | PB row 714-3<br>CC1 – rd2<br>CC2 – wr2 |
| MB 708-21<br>CC1 – rd1 | MB 708-22<br>CC1 – wr1 | MB 708-23<br>CC1 – rd1 | MB 708-24<br>CC1 – rd1 | PB row 714-2<br>CC1 – rd1<br>CC2 – wr1 |
| MB 708-11<br>CC1 – wr0 | MB 708-12<br>CC1 – rd0 | MB 708-13<br>CC1 – rd0 | MB 708-14<br>CC1 – rd0 | PB row 714-1<br>CC1 – rd0<br>CC2 – wr0 |

730 ↗   700 ↗

MULTIPLE READ AND WRITE PORT MEMORY

CROSS-REFERENCES TO RELATED APPLICATIONS

The present application is a continuation-in-part of U.S. patent application Ser. No. 15/143,200, entitled "Multiple Read and Write Port Memory," filed on Apr. 29, 2016, which claims the benefit of U.S. Provisional Patent Application Nos.: 62/154,793, entitled "Multi-Bank Access for Two Read Ports or One Write Port Memory," filed on Apr. 30, 2015; 62/154,797, entitled "Multi-Bank Access for Two Read Ports or One Read Port and One Write Port Memory," filed on Apr. 30, 2015; 62/155,683, entitled "Multi-Bank Access for Two Read Ports and Two Write Ports Dynamic Memory," filed on May 1, 2015; 62/156,693, entitled "Bank Multi Access for Four Read Ports or Four Write Ports Memory," filed on May 4, 2015; 62/157,707, entitled "Bank Multi Access for 4 Read Ports or Four Write Ports Dynamic Memory," filed on May 6, 2015; 62/157,716, entitled "Bank Multi Access for Four Read Ports or Four Read and One Write Ports Memory," filed on May 6, 2015; 62/158,703, entitled "Bank Multi Access for Four Read Ports And Four Write Ports Dynamic Memory," filed on May 8, 2015; 62/158,708, entitled "Bank Multi Access for Multiple Read Ports and Multiple Write Ports," filed on May 8, 2015; and 62/159,482, entitled "Bank Multi Access for Four Read or One Write Memory," filed on May 11, 2015. The present application also claims the benefit of U.S. Provisional Patent Application No. 62/384,259, entitled "Diagonal Memory Algorithm for Four Read Operations or Four Write Operations in a Single Memory Cycle," filed on Sep. 7, 2016.

All of the applications referenced above are hereby incorporated by reference herein in their entireties.

FIELD OF THE DISCLOSURE

The present disclosure relates generally to computer memories, and more particularly, to memory devices having multiple memory banks and storing parity data to support multiple simultaneous memory accesses.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Conventional memory single port devices typically are configured so that during any given clock cycle only a single memory operation, such as a read operation or a write operation, can be performed at a particular block of memory. Moreover, because write operations may require several clock cycles to complete, performance of various read operations may also be delayed for several clock cycles in conventional memories. In the context of some networking or switching applications, various data that is used for packet processing, for example control tables, forwarding tables and the like, are shared among various switching devices or switching cores of a single device. At times, these multiple devices and cores need to perform read and write operations in a particular memory block during the same clock cycle.

In some systems, various devices are provided with their own respective memories, however such a solution is expensive both in terms of the direct cost of additional memory as well as in terms of resources required to keep the different memories synchronized.

U.S. Pat. No. 8,514,651, entitled "Sharing Access to a Memory Among Clients", and which is assigned to the present assignee and incorporated by reference herein in its entirety, describes a system and method in which two or more read requests to read data from a target memory bank shared by two or more clients are serviced during a single clock cycle. A first one of the read requests is serviced by permitting direct accesses to the target memory bank during a clock cycle. The additional read requests are also serviced in the clock cycle by using parity data to reconstruct data in the target memory bank without directly accessing the target memory bank.

SUMMARY

In an embodiment, a memory device comprises a set of content memory banks configured to store content data. The memory device also comprises a set of parity memory banks configured to store parity data for reconstructing content data stored in the set of content memory banks. The memory device additionally comprises a memory control device configured to in response to receiving, in a first clock cycle, at least (i) a first request requesting a first memory operation to be performed in a first content memory bank of the set of content memory banks and (ii) a second request requesting a second memory operation to be performed in the first content memory bank, the second memory operation being a write operation to write new content data to the first content memory bank, service the first request at least by performing the first memory operation in the first content memory bank, and service the second request at least by writing the new content data to a second content memory bank different from the first content memory bank, the second content memory bank selected from a subset of the set of content memory banks, the subset defined by content memory banks that correspond with one or more parity memory banks different from one or more parity memory banks that correspond with the first content memory bank. The memory control device is further configured to update, based on the new content data written to the second content memory bank, parity data in the one or more parity memory banks that correspond with the second content memory bank.

In another embodiment, a method of operating a memory device includes receiving, at a memory control device in a same clock cycle, multiple requests for performing respective operations in a first content memory bank of a set of content memory banks, including receiving at least a first request and a second request, the second request being for performing a write operation to write new content data to the first content memory bank. The method also includes servicing, with the memory control device, the first request at least by performing the first memory operation in the first content memory bank, the first content memory bank corresponding with one or more parity memory banks, in a set of parity memory banks, configured to store parity data for reconstructing data stored in the first content memory bank. The method further includes selecting, with the memory control device from a subset of the content memory banks, a second content memory bank for servicing the second request, the subset defined by content memory banks, in the set of content memory banks, that correspond with one or more parity memory banks, in the set of parity memory banks, different from one or more parity memory banks that correspond with the first content memory bank. The method additionally includes servicing, with the memory control device, the second request at least by writing the new content data to the second content memory bank. The method further still includes updating, with the memory control device based on the new content data, parity data in the one or more parity memory banks that correspond with the second content memory bank.

BRIEF DESCRIPTION OF THE DRAWINGS

FIG. 3 is a block diagram of an example logical-to-physical mapping table, according to an embodiment.

FIG. 5 is a flow diagram of a method for servicing a write request in a memory bank system that includes single-port content memory banks, according to an embodiment.

FIGS. 6A-6D are block diagrams illustrating various example scenarios in which multiple memory requests are concurrently performed in a memory bank system that includes multi-port content memory banks, according to embodiments.

FIGS. 7A-7C are block diagrams illustrating various example scenarios in which multiple memory requests are concurrently performed in a memory bank system that includes single-port content memory banks, according to embodiments.

DETAILED DESCRIPTION

Various embodiments of memory devices are described below. In some embodiments, the memory devices described herein utilize techniques described in U.S. Pat. No. 8,514,651, entitled "Sharing Access to a Memory Among Clients," which is hereby incorporated by reference herein in its entirety. In some embodiments, the memory devices described herein utilize techniques described in U.S. patent application Ser. No. 14/964,219, entitled "System and Method for Performing Simultaneous Read and Write Operations in a Memory," which is hereby incorporated by reference herein in its entirety.

Figure 1:
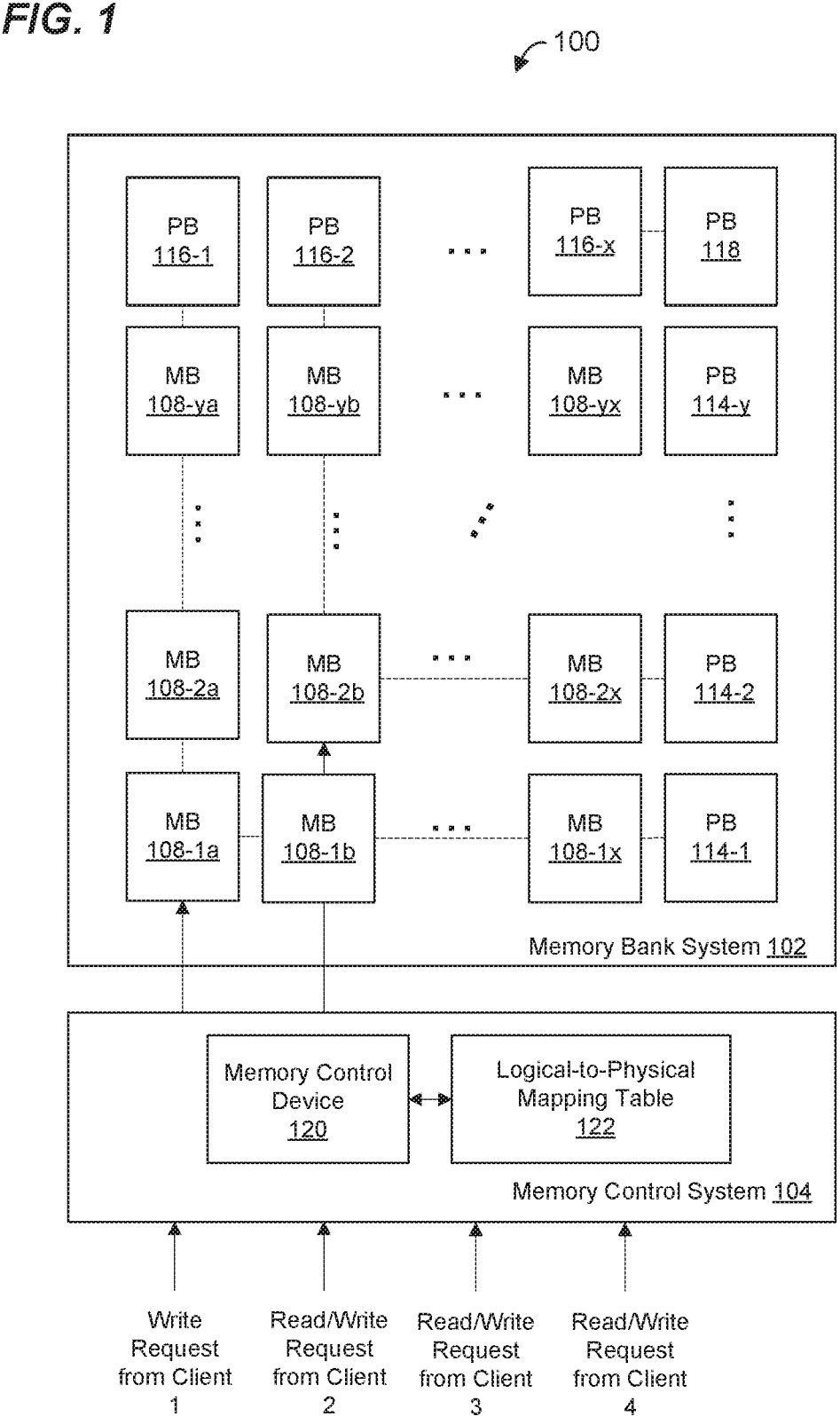
FIG. 1 is a block diagram of an example memory device, according to an embodiment.

FIG. 1 is a block diagram of an example memory device 100, according to an embodiment. The memory device 100 includes a memory bank system 102 and a memory control system 104. In an embodiment, the memory bank system 102 includes a set of memory banks 108 to store content data (sometimes referred to herein as "content memory banks"). The memory system 102 also includes a set of memory banks 114-118 to store parity data (sometimes referred to herein as a "parity memory banks") that is suitable for use by error correction algorithms. In an embodiment, even though each content memory bank 108 allows at most two memory operations to be performed in the memory bank in any given clock cycle, the memory device 100 guarantees, in an embodiment, that more than two memory requests can be serviced in the memory bank system 102 in a given clock cycle. For example, in an embodiment, the memory device 100 guarantees that up to four memory requests can be serviced in the memory bank system 102 in a given clock cycle. In an embodiment, the memory device 100 services a first one of multiple read requests, received in a same clock cycle and directed to a first content memory bank, by reading the requested content data from the first content memory bank, and services one or more other ones of the multiple read requests by reconstructing the requested content data from i) corresponding content data read from other ones of the content memory banks and ii) corresponding parity data read from the parity memory banks. In an embodiment, the memory device 100 services a first one of multiple write requests, received in a same clock cycle and directed to a first content memory bank, by writing the requested content data to the first content memory bank, and services one or more other ones of the multiple write requests by i) writing the requested content data to redundant memory locations in other content memory banks and ii) remapping the redundant memory locations to the requested memory location in the first content memory bank.

The memory control system 104 includes a memory control device 120 configured to concurrently service multiple requests received from respective ones of multiple clients of the memory device 100, in an embodiment. In an embodiment, each content memory bank 108 is a part of one or more sets of content memory banks 108, and each of the one or more sets of content memory banks 108 corresponds with a respective parity memory bank 114, 116. Additionally, the sets of content memory banks 108 correspond with an additional parity memory bank 118. In the embodiment illustrated in FIG. 1, for example, the memory bank system 102 is configured as a two-dimensional grid of content memory banks 108. For ease of explanation, a first dimension of the grid is referred to in the description below as "rows" and a second dimension of the array is referred to as "columns". Use of the terms "row", "rows", "column", and "columns" is not meant to connote a particular spatial orientation of the memory bank system 102, but merely is for ease in distinguishing between the first dimension and the second dimension in the description below. In an embodiment, each particular content memory bank 108 is a part of a first set of content memory banks 108 positioned in the row that includes the particular content memory bank 108, and a second set of content memory banks 108 in the column that includes the particular content memory bank 108. Content memory banks 108 in each row in the grid of content memory banks 108 correspond with a particular parity memory bank (row parity memory bank) 114. Similarly, content memory banks 108 in each column in the grid of content memory banks 108 correspond with a particular parity memory bank (column parity memory bank) 116. Additionally, all rows of content memory banks 108 and all columns of content memory banks 108 correspond with the parity memory bank positioned in the corner of the grid (corner parity memory bank) 118.

In an embodiment, when the memory device 100 receives multiple read requests for reading content data from a particular content memory bank 108 in a same clock cycle, the memory control device 120 services a first one of the multiple requests by reading the requested content data directly from the particular content memory bank 108, and services the other one(s) of the multiple read requests by reconstructing the requested content using i) content data read from one or more sets of content memory banks 108 of with the particular content memory bank 108 is a part and ii) parity data read from one or more parity memory banks 114-118 that correspond with the particular content memory bank 108. For example, in an embodiment, data at a particular memory location in a particular content memory bank 108 can be reconstructed, without accessing the particular content memory bank 108, based on (i) content data at corresponding memory locations in other content memory banks 108 in the row of which the particular content memory bank 108 is a part and (ii) parity data in a corresponding memory location in the row parity memory bank 114 that corresponds with the row of which the particular memory bank 108 is a part. Similarly, data at a particular memory location in a particular content memory bank 108 can also reconstructed, without accessing the particular content memory bank 108, based on (i) content data at corresponding memory locations in other content memory banks 108 in the column of which the particular content memory bank 108 is a part and (ii) parity data in a corresponding memory location in the column parity memory bank 114 that corresponds with the column of which the particular memory bank 108 is a part, in an embodiment. Moreover, data at a particular memory location in a particular content memory bank 108 can also be reconstructed without accessing the particular content memory bank 108, based on (i) content data at corresponding memory locations in content memory banks 108 in rows other than the row of which the particular content memory bank 108 is a part, (ii) content data at corresponding memory locations in content memory banks 108 in columns other than the column of which the particular content memory bank 108 is a part, (iii) parity data at the corresponding memory locations in the row parity memory banks 114 that correspond with rows other than the row of which the particular memory bank 108 is a part, (iv) parity data at the corresponding memory locations in the column parity memory banks 116 that correspond with columns other than the column of which the particular memory bank 108 is a part, and (iv) the corresponding memory location in the corner parity memory bank 118, in an embodiment.

In an embodiment, to allow multiple write requests directed to a particular content memory bank 108, or one or more read requests and one or more write requests directed to a particular content memory bank 108, to be serviced in a single clock cycle, the memory bank system 102 maintains a physical address space that is larger than a logical address space exposed to clients of the memory device 100. The larger physical address space includes redundant memory space such that new content data addressed to a particular logical address in the memory bank system 102 can be written to one of multiple possible physical addressed in the memory bank system 102. In an embodiment, to service a write request concurrently with another request directed to a particular content memory bank 108, the memory control device 120 selects a content memory bank 108, other than the particular content memory bank 108, that has a redundant memory location for writing new content data requested by the write request. The memory control device 108 writes the new content data to the redundant memory location in the selected content memory bank 108, and remaps the physical address of the redundant memory location to which the new content data was written to the logical address to which the content data was addressed by the write request. For example, in an embodiment, the memory control system 104 includes, or is coupled to, a logical-to-physical mapping table 122 that indicates mappings between logical addresses and physical addresses in the memory bank system 120. When the memory control device 120 writes new content data to the redundant memory location the selected content memory bank 108, the memory control device 120 updates the logical-to-physical mapping table 122 to indicate a mapping between the physical address of the redundant memory location in the selected content memory bank 108 and the logical address requested for the new content data by the write request, in an embodiment. Additionally, the memory control device 120 marks the physical address in the particular content memory bank 108 to which the write request was directed to now serve as a redundant memory location available for servicing subsequent write requests, in an embodiment.

Writing new content data to the selected content memory bank 108 includes updating, based on the new content data, corresponding parity data in each of the parity memory banks 114-118 such that the new content data can subsequently be reconstructed using the parity data as described above, in an embodiment. In an embodiment, when the memory control device 120 selects a content memory bank 108 in which to service a write request concurrently with other one or more requests, the memory interface device 120 selects the content memory bank 108 such that the selected content memory bank 108 corresponds with one or more parity memory banks 114, 116 different from one or more parity memory banks 114, 116 that correspond with any content memory bank 108 being used in connection with servicing the one or more other requests. As explained in more detail below, selecting a content memory bank 108 in which to service the write request such that the selected content memory bank 108 corresponds with one or more parity memory banks 114, 116 different from the one or more parity memory banks 114, 116 that correspond with any content memory bank 108 used in connection with servicing the other one or more requests allows parity data in the parity memory banks 114, 116 to be updated, based on the new content data written the selected content memory bank 108, without blocking any other requests from being serviced in the content memory banks 108 in a next clock cycle that immediately follows an initial clock cycle of servicing the write request, in an embodiment. Accordingly, selecting the content memory bank 108 in which to service the write request such that the selected content memory bank 108 corresponds with one or more parity memory banks 114, 116 different from the one or more parity memory banks 114, 116 that correspond with any content memory bank 108 used in connection with servicing the other one or more requests in the content memory banks 108 guarantees that the memory device 100 is able to handle a certain number of requests (e.g., up to four requests) in any given clock cycle, in an embodiment.

Figure 2:
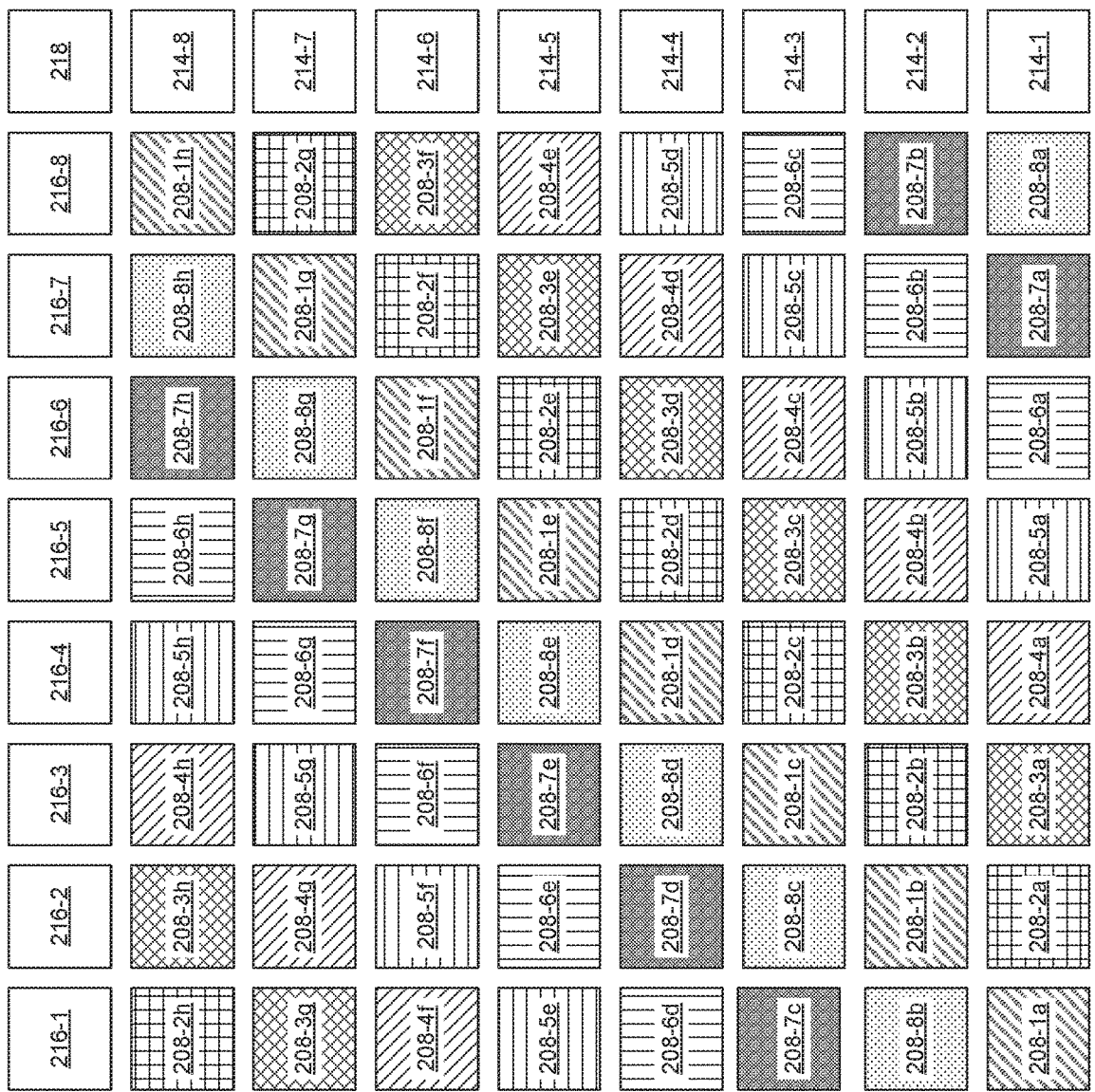
FIG. 2 is a block diagram of a memory bank system used with the memory device 100 of FIG. 1, according to an embodiment.

FIG. 2 is a block diagram of a memory bank system 200, according to an embodiment. In an embodiment, the memory bank system 200 corresponds to the memory bank system 102 of FIG. 1. For example purposes, the memory bank system 200 is described with reference to the memory device 100 of FIG. 1. However, the memory bank system 200 is used with memory devices different from the memory device 100 of FIG. 1. Similarly, the memory device 100 of FIG. 1 utilizes a memory bank system different from the memory bank system 200, in some embodiments. The memory bank system 200 guarantees servicing up to four memory requests in a single clock cycle, in an embodiment. Memory systems similar to the memory bank system 200 guarantee other maximum numbers of memory requests to be serviced in a single clock cycle, in other embodiments.

The memory bank system 200 is configured as a two dimensional grid of rows and columns of content memory banks 208. The memory bank system 200 also includes a set of row parity memory banks 214, a set of column parity memory banks 216 and a corner parity memory bank 218. In an embodiment, the content memory banks 208 are single-port memory banks that support only one memory operation in a clock cycle. In another embodiment, the content memory banks 208 are two-port memory banks that support up to two memory operations, such as servicing two read requests, in a single clock cycle. Similarly, the row parity memory banks 214, 216 are two-port memory banks that support up to two memory operation in a clock cycle, in an embodiment. The corner memory bank 218 is a four-port memory bank, or a memory bank implemented using flip-flops, that supports at least four memory operations in a clock cycle, in an embodiment.

Respective ones of the row parity memory banks 214 correspond with respective rows of content memory banks 208 and store parity data for reconstructing content data in the respective rows of content memory banks 208. For example, a first row parity memory bank 214 (e.g., the row parity memory bank 214-1) corresponds with a first row of content memory banks 208 (e.g., the bottom-most row of memory banks 208 in FIG. 2) and stores parity data for reconstructing content data in the first row of content memory banks 208, a second row parity memory bank 214 (e.g., the row parity memory bank 214-2) corresponds with a second row of content memory banks 208 (e.g., the second bottom-most row of content memory banks 208) and stores parity data for reconstructing content data in the second row of content memory banks 208, and so on, in an embodiment. Similarly, respective ones of column parity memory banks 216 correspond with respective columns of content memory banks 208 and store parity data for reconstructing content data in the respective columns of content memory banks 208. For example, a first column parity memory bank 216 (e.g., the column parity memory bank 216-1) corresponds with a first column of content memory banks 208 (e.g., the left-most column of content memory banks 208 in FIG. 2) and stores parity data for reconstructing content data in the first column of content memory banks 208, a second column parity memory bank 216 (e.g., the column parity memory bank 216-2) corresponds with a second column of content memory banks 208 (e.g., the second left-most column of content memory banks 208 in FIG. 2) and stores parity data for reconstructing content data in the second column of memory banks 208, and so on, in an embodiment. The corner parity memory bank 218 corresponds with each row parity memory bank 214 and each column parity memory bank 216 and stores parity data for reconstructing parity data in each row parity memory bank 214 or each column parity memory bank 216, in an embodiment.

In some embodiments, each memory bank illustrated in FIG. 2 is structured as a memory array where respective elements of the memory array correspond with i) respective elements of the other memory arrays in the same row, ii) respective elements of the parity memory array in the same row, iii) respective elements of the other memory arrays in the same column, iv) respective elements of the parity memory array in the same column, and v) respective elements of the corner parity memory array. Thus, for example, respective elements of the content memory bank 208-1*a* correspond with i) respective elements of the content memory banks 208-2*a*, 208-3*a*, 208-4*a*, 208-5*a*, 208-6*a*, 208-7*a*, 208-8*a* in the same row, ii) respective elements of the row parity memory bank 214-1, iii) respective elements of the content memory banks 208-8*b*, 208-7*c*, 208-6*d*, 208-5*e*, 208-4*f*, 208-3*q*, 208-2*h* in the same column, iv) respective elements of the column parity memory bank 216-1, and v) respective elements of the corner parity memory bank 218, in the illustrated embodiment. Similarly, as another example, respective elements of the content memory bank 208-2*a* correspond with i) respective elements of the content memory banks 208-1*a*, 208-3*a*, 208-4*a*, 208-5*a*, 208-6*a*, 208-7*a*, 208-8*a* in the same row, ii) respective elements of the row parity memory bank 214-1, iii) respective elements of the content memory banks 208-1*b*, 208-8*c*, 208-7*d*, 208-6*e*, 208-5*f*, 208-4*q*, 208-3*h* in the same column, iv) respective elements of the column parity memory bank 216-2, and v) respective elements of the corner parity memory bank 218, in the illustrated embodiment.

In an embodiment, the memory bank system 200 defines a physical address space that is larger than a logical address space exposed to clients of the memory device 100. For example, whereas the memory bank system 200 includes an eight-by-eight grid of content memory banks 208 (i.e., 64 content memory banks), the logical address space of the memory bank system 200 includes addressable memory locations corresponding to a four-by-four grid of content memory banks 208 (i.e., 16 content memory banks), in an embodiment. The additional physical memory locations in the content memory banks 208 are used as redundant memory locations for writing new content data to content memory banks 208, in an embodiment. For example, as described above with respect to FIG. 1, when the memory device 100 receives a write request indicating a particular logical address, the memory control device 120, in an embodiment, selects a content memory bank 208 that has a redundant memory location for writing new content data, and writes the new content data to the redundant memory location in the selected different content memory bank 208. The memory device 100 then maps the physical address of the memory location to which the new content data was written in the selected content memory bank 208 to the logical address indicated by the write request, for example by updating the corresponding mapping in the mapping table 122, in an embodiment. Additionally, the memory device 100 marks the physical memory location that was addressed by the write request as redundant, making the physical memory location available to be selected for a subsequent write request, in an embodiment.

In an embodiment, the memory device 100 utilizes diagonals in the grid of content memory banks 208 to facilitate selection of content memory banks 208 in which to service write requests such that the selected content memory banks correspond with row and column parity memory banks 114, 116 different from row and column parity memory banks 114, 116 that correspond with content memory banks 208 concurrently used in connection with servicing other request in the memory bank system 200. In the example embodiment of FIG. 2, the memory system 200 includes eight diagonals of content memory banks 208 illustrated in FIG. 2 by differently patterned blocks. For instance, a first diagonal in the memory system 200 includes the content memory banks 208-1*a* through 208-1*h*, a second diagonal includes the content memory banks 208-2*a* through 208-2*h*, and so on, in an embodiment. As seen in FIG. 2, respective content memory banks 208 in a particular diagonal correspond with i) different ones of the row parity memory banks 214 and ii) different ones of the column parity memory banks 216. For example, in the diagonal that includes the content memory banks 208-1*a* through 208-1*h*, the content memory bank 208-1*a* corresponds with the row parity memory bank 214-1 and the column parity memory banks 216-1, the content memory bank 208-1*b* corresponds with the row parity memory bank 214-2 and the column parity memory bank 216-2, the content memory bank 208-1*c* corresponds with the row parity memory bank 214-3 and the column parity memory bank 216-3, and so on, in an embodiment. Similarly, as another example, in the diagonal that includes the content memory banks 208-2*a* through 208-2*h*, the content memory bank 208-2*a* corresponds with the row parity memory bank 214-1 and the column parity memory bank 216-2, the content memory bank 208-2*b* corresponds with the row parity memory banks 214-2 and the column parity memory bank 216-3, the content memory bank 208-2*c* corresponds with the row parity memory bank 214-3 and the content memory bank 216-4, and so on, in an embodiment.

When the memory device 100 receives multiple requests to be concurrently serviced in the memory bank system 200, the requests including one or more write requests to write new content data to the memory bank system 200, the memory control device 120 selects content memory banks 208 in which to service the one or more write requests from subsets of content memory banks 208 that correspond with different ones of the row parity memory banks 214 and column parity memory banks 216, in an embodiment. Thus, in an embodiment, the memory control device 120 selects content memory banks 208 in which to service the one or more write requests such that each selected content memory bank 208 is positioned in i) a row different from any row occupied by any other selected content memory bank and ii) a column different from any column occupied by any other selected content memory bank. In an embodiment, for example, the memory control device 120 selects content memory banks 208 in which to service the one or more write requests from a set of content memory banks 208 that are positioned on a same diagonal in the memory bank system 200. Selecting the content memory banks 208 from a subset of content memory 208 that are positioned on a same diagonal insures that the selected content memory banks 208 will correspond with different ones of the row parity memory banks 214 and column parity memory banks 216, in an embodiment. In another embodiment, the memory control device 120 selects content memory banks 208 in which to service the one or more write requests from different sets of content memory banks 208 that are positioned in respective different diagonals in the memory bank system 200. In this embodiment, the memory control device 120 selects, within each one of the different sets of content memory banks 208 that are positioned in respective different diagonals in the memory bank system 200, a content memory bank 208 that does not share a row or a column with any other content memory bank 208 selected from the other one(s) of the sets of content memory banks 208 that are positioned in respective other diagonals in the memory bank system 200. In the embodiment of FIG. 2, the memory bank system 200 supports servicing up to four write requests in any given clock cycle. Thus, the memory control device 120 selects, in any given clock cycle, up to four diagonals for servicing up to four write requests. Within a diagonal selected for servicing a particular write request, the memory control device 120 selects a particular content memory bank 208 in which to service the particular write request such that the selected content memory bank 208 occupies a row and a column that is not occupied by any other content memory bank 208 being accessed for another request being serviced in the same clock cycle. As will be explained in more detail below, in an embodiment, four write requests directed to a first content memory bank 208 are serviced in the following manner: a first one of the four write requests is serviced in the first content memory bank 208, other ones of the four write requests are serviced in redundant memory locations in selected other content memory banks 208, and the redundant memory locations in the selected other content memory banks 208 are remapped to the corresponding requested memory locations in the first content memory bank 208.

In an embodiment, servicing a write request in a content memory bank 208 includes i) writing new content data to the content memory bank 208 and ii) updating parity data in the corresponding row parity memory bank 214, the corresponding column parity memory bank 216 and the corner parity memory bank 218. Example operations that are performed in the memory system 200 to complete a write request in a particular one of the content memory bank 208 depend on whether the content memory banks 208 are multi-port memory banks or single-port memory banks, in various embodiments. Example operations performed to service a write request in the memory bank system 200 in an embodiment in which the content memory banks 208 are two-port memory banks are described below with respect to FIG. 4. Example operations performed to service a write request in the memory bank system 200 in an embodiment in which the content memory banks 208 are single-port memory banks are described below with respect to FIG. 5. Generally, selection of content memory banks 208 in which to perform write operations as described above ensures that up to four request, including up to four write requests, can be independently serviced in a given clock cycle, and that corresponding parity data can be updated in a next clock cycle that immediately follows the given clock cycle, without interfering with servicing any requests in the second clock cycle, in an embodiment.

Figure 3:
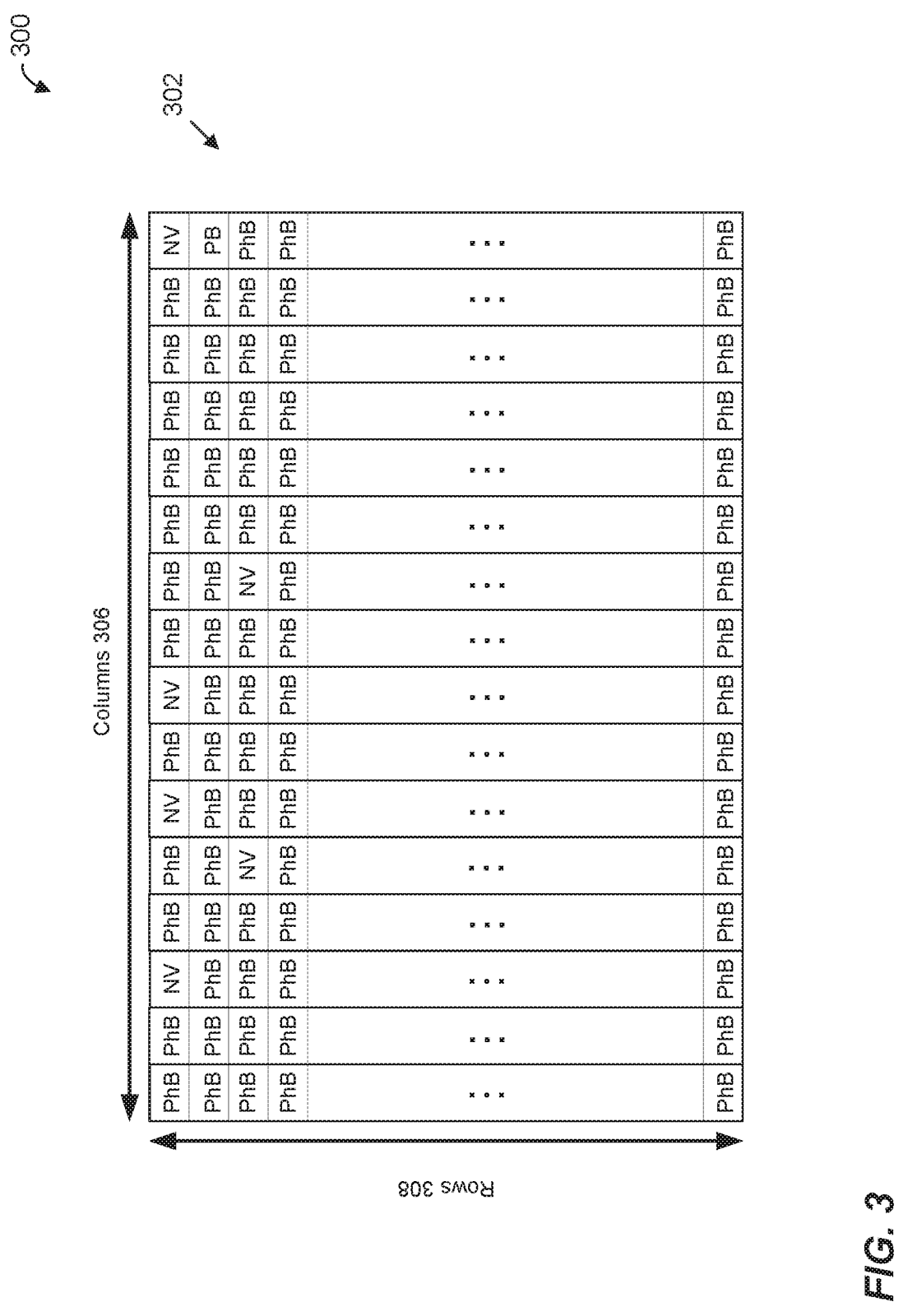

Referring briefly to FIG. 3 a logical-to-physical table 300 corresponds to the logical-to-physical table 122 of the memory device 100 FIG. 1, in an embodiment. In another embodiment, the logical-to-physical mapping table 300 is used with a memory device different from the memory device 100 of FIG. 1. Similarly, the memory device 100 of FIG. 1 utilizes a logical-to-physical mapping table different from the mapping table 300, in an embodiment. For ease of explanation, the logical-to-physical table 300 is described with reference to the memory device 100 of FIG. 1.

The logical-to-physical mapping table 300 includes a plurality of entries 302 arranged as a grid of columns 306 and rows 308. Respective columns 306 are associated with respective logical memory banks that are logically addressable by clients of the memory device 100. In the example embodiment of FIG. 3, the logical-to-physical mapping table 300 includes sixteen columns 306 respectively associated with sixteen logical memory banks logically addressable by clients of the memory device 100. In other embodiments, the logical-to-physical mapping table 300 includes other suitable numbers of columns 306 respectively associated with corresponding other numbers of logical memory banks logically addressable by clients of the memory device 100. Respective rows 308 are associated with respective memory locations logically addressable by clients of the memory device 100, in an embodiment. For example, in an embodiment in which the memory banks are structured as arrays of corresponding memory locations as described above with reference to FIG. 1, respective rows 308 are associated with respective elements of the arrays.

In an embodiment, an entry 302 in a particular column 306 and particular row 308 stores information indicative of the physical content memory bank (PhB) 108 in which the content data that was logically addressed to the memory bank associated with the particular column 306 and a memory location, within the memory bank, associated with the particular row 308, was actually written in the memory system 102. In an embodiment, when the memory control device 120 writes new content data to a memory location in a content memory bank 108, the memory control device 120 updates the corresponding entry 302 to indicate the physical content memory bank 108 to which the content data was written. When the memory control device 120 is to read content data from a memory location in a content memory bank 108, the memory control device 120 accesses the corresponding entry 302 to determine in which physical content memory bank 108 is stored, in an embodiment.

With continued reference to FIG. 3, in an embodiment, if a physical memory bank 108 is not indicated in any entry 302 in a particular row 308, this indicates that the corresponding memory location in the physical memory bank 108 is a redundant memory location available for writing new content data. Additionally, in an embodiment, one or more of the entries 302 in the logical-to-physical mapping table 300 are marked as not valid (NV) to indicate that the corresponding memory location in each of the physical memory banks 108 is available for writing new content data. For example, an entry 302 is marked not valid if no content data addressed to the corresponding logical address has yet been written to the memory bank system 102 or if content data addressed to the corresponding logical address is no longer needed and can be overwritten, in an embodiment.

Figure 4:
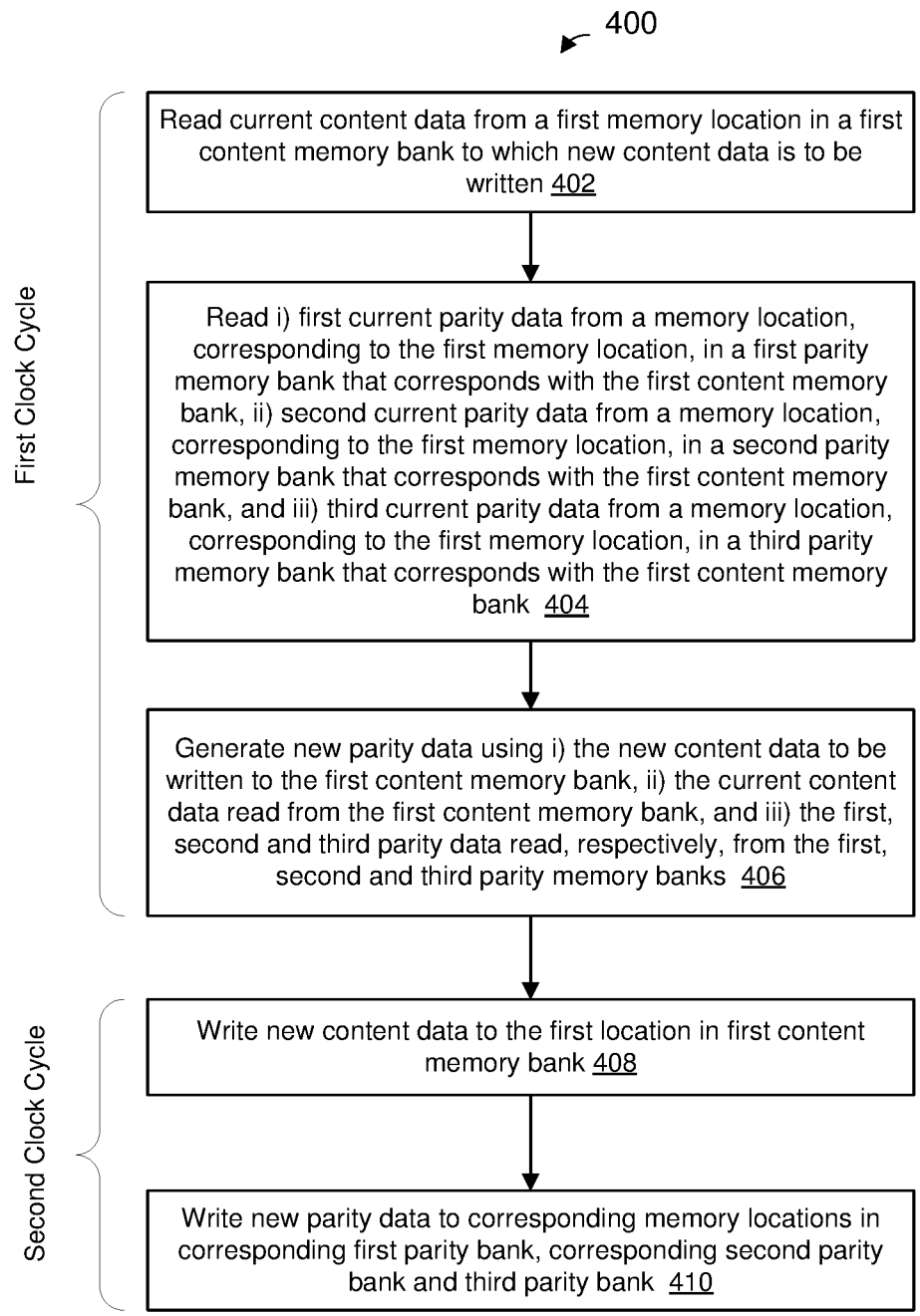
FIG. 4 is a flow diagram of a method for servicing a write request in a memory bank system that includes multi-port content memory banks, according to an embodiment.

FIG. 4 is a flow diagram of a method 400 for servicing a write request in a memory bank system that includes multi-port content memory banks, according to an embodiment. In an embodiment, the memory device 100 of FIG. 1 is configured to implement the method 400 to service a write request in a memory bank system such as the memory bank system 200 of FIG. 2. For example, the memory control device 120 of the memory device 100 of FIG. 1 is configured to implement the method 400 to service a write request in the memory bank system 200 of FIG. 2. In other embodiments, the method 400 is implemented by a memory device different from the memory device 100 of FIG. 1 and/or with a memory system different from the memory system 200 of FIG. 2. Similarly, the memory control device 120 is configured to implement a method different from the method 400 to service a write request in the memory system 200, or in a memory system different from the memory system 200, in some embodiments. For example purposes, the method 400 is described with reference to FIGS. 1 and 2. In particular, for ease of explanation, the method 400 is described as being performed by the memory control device 120 to write new content data to a first memory location in a first content memory bank (e.g., the memory bank 208-1a).

At block 402, current content data is read from the first memory location in the first content parity memory bank to which new content data is to be written. In an embodiment, the memory control device 120 reads current content data from the first memory location in the content memory bank 208-1a.

At block 404, current parity data, to be overwritten by new parity data calculated based on the new content data, is read from parity memory banks that correspond with the first content memory bank. In an embodiment, i) first current parity data is read from a memory location, corresponding to the first memory location, in a first parity memory bank that corresponds with the first content memory bank, ii) second current parity data is read from a memory location, corresponding to the first memory location, in a second parity memory bank that corresponds with the first content memory bank, and iii) third current parity data is read from a memory location, corresponding to the first memory location, in a third parity memory bank that corresponds with the first content memory bank. For example, in an embodiment, the memory control device 120 reads i) current row parity data from a memory location, corresponding to the first memory location, in the row parity memory bank 114-1, ii) current column parity data from a memory location, corresponding to the first memory location, in the column parity memory bank 116-1, and iii) current corner parity data from a memory location, corresponding to the first memory location, in the corner parity memory bank 118.

At block 406, new parity data is generated. In an embodiment, generating the new parity data includes calculating a) new first parity data that is to overwrite the first current parity data, b) new second parity data is to overwrite the second current parity data, and c) third new parity data that is to overwrite the third current parity data. In an embodiment, the memory control device 120 calculates a) new row parity data by XORing together i) the new content data to be written to the first content memory bank, ii) the current content data read from the first content memory bank, and iii) the current row parity data read from the row parity memory bank that corresponds with the first content memory bank, b) new column parity data by XORing together i) the new content data to be written to the first content memory bank, ii) the current content data read from the first content memory bank, and iii) the current column parity data read from the column parity memory bank that corresponds with the first content memory bank, and c) new corner parity data. In an embodiment, the new corner parity data is calculated by XORing together i) the new row parity data, ii) the current row parity data read from the row parity memory bank that corresponds with the first content memory bank and iii) the new column parity data. Alternatively, in another embodiment, the new corner parity data is calculated by XORing together i) the new row parity data, ii) the current column parity data read from the column parity memory bank that corresponds with the first content memory bank, and iii) the current corner parity data read from the corner memory bank.

At block 408, the new content data is written to the first memory location in the first content memory bank. In an embodiment, the memory control device 120 writes the new content data to the first memory location in the content memory bank 208-1a.

At block 410, first new parity data, second new parity data and third new parity data is written, respectively, to the first parity memory bank, the second parity memory bank and the third parity memory bank. In an embodiment, the memory control device 120 writes i) the new row parity data to the memory location, that correspond to the first memory in the content memory bank 218-1a, in the row parity memory bank 214-1, ii) the new column parity data to the memory location, that correspond to the first memory in the content memory bank 218-1a, in the column parity memory bank 216-1, and iii) the new corner parity data to the memory location, that corresponds to the first memory location, that correspond to the first memory in the content memory bank 218-1a, in the corner parity memory bank 218.

In an embodiment, blocks 402-406 are performed during a first clock cycle of servicing the write request, and blocks 408-410 are performed during a second clock cycle that immediately follows the first clock cycle of servicing the write request, thereby completing the write operation in only two clock cycles. In another embodiment, block 406 is performed at least partially during the second clock cycle. In an embodiment, if the write request is being serviced by the memory control device 120 according to the method 400 concurrently with one or more other memory requests in a same clock cycle, the memory control device 120 selects the first content memory bank in which to write the new content data such that the first content memory bank correspond with first and second (e.g., row and column) parity memory banks different from first and second (e.g., row and column) parity memory banks that correspond with any content memory bank being used in connection with servicing the other one or more memory requests. Selecting such first content memory bank in which to write the new content data allows the memory control device 120 to perform operations of the method 400 without having to access any parity memory banks being used in connection with servicing the other one or more memory requests, thereby allowing the memory control device 120 to perform operations of the method 400 to service the write request concurrently with the other one or more memory requests without interfering with memory operations performed in connection with servicing the other one or more memory requests.

FIG. 5 is a flow diagram of a method for servicing a write request in a memory bank system that includes single-port content memory banks, according to an embodiment. In an embodiment, the memory device 100 of FIG. 1 is configured to implement the method 500 to service a write request in a memory bank system such as the memory bank system 200 of FIG. 2. For example, the memory control device 120 of the memory device 100 of FIG. 1 is configured to implement the method 500 to service a write request in the memory bank system 200 of FIG. 2. In other embodiments, the method 500 is implemented by a memory device different from the memory device 100 of FIG. 1 and/or with a memory system different from the memory system 200 of FIG. 2. Similarly, the memory control device 120 is configured to implement a method different from the method 500 to service a write request in the memory system 200, or in a memory system different from the memory system 200, in some embodiments. For example purposes, the method 500 is described with reference to FIGS. 1 and 2. In particular, for ease of explanation, the method 500 is described as being performed by the memory control device 120 to write new content data to a first memory location in a first content memory bank (e.g., the content memory bank 208-1a).

The method 500 is generally similar to the method 400 of FIG. 4. However, because the method 500 is used with single-port content memory banks, the method 500 avoids accessing the single-port content memory banks during a second clock cycle of servicing the write request to allow the single-port content memory banks to be accessed for servicing other memory operation requests during the second clock cycle. To this end, rather than reading current content data from the first content memory bank in the first clock cycle and writing the new content data to the first content memory bank in the second clock cycle, the memory control device 120 writes the new content data to the first memory bank in the first clock cycle and, also in the first clock cycle, reads current content data from corresponding memory locations in other content memory banks (e.g., other content memory banks in the row of which the first content memory bank is a part) and parity data for reconstructing content data in the first content memory bank. The memory control device 120 then reconstructs the old content data, overwritten by the new content data, in the first content memory bank, using the content data read from the other content memory banks and parity data, and generates new parity data based on the current parity data, the new content data, and the reconstructed old content data. Then, during the second clock cycle, the memory control device 120 writes the new parity data to the parity memory banks. Accordingly, only the multi-port parity memory banks are accessed for servicing the write request during the second clock cycle, in an embodiment. The single-port content memory banks need not be accessed for servicing the write operation during the second clock cycle and, therefore, are available for performing memory operation in connection with other memory requests during the second clock cycle.

Referring now to FIG. 5, at block 502, the new content data is written to the memory location in the first content memory bank. For example, the memory control device 120 writes the new content data to the first memory location in the content memory bank 208-1a.

At block 504, current content data is read from the memory locations, corresponding to the first memory location in the first content memory bank, in the other content memory banks in a set of memory banks of which the first content memory bank is a part. For example, current content data is read from the memory locations, corresponding to the first memory location in the first content memory bank, in the other content memory banks in the row of which the first content memory bank is a part. In an embodiment, the memory control device 120 reads the current content data from the content memory banks 208-2a, 208-3a, 208-4a, 208-5a, 208-6a, 208-7a, 208-8a. The other memory banks in the row of which the first content memory bank is a part include content memory banks with valid entries in the memory locations corresponding to the first memory location and the first content memory bank and content memory banks with non-valid entries in the memory locations corresponding to the first memory location and the first content memory bank, in at least some embodiments.

At block 506, current parity data, to be overwritten by new parity data calculated based on the new content data, is read from parity memory banks that correspond with the first content memory bank. In an embodiment, i) first current parity data is read from a memory location, corresponding to the first memory location, in a first parity memory bank that corresponds with the first content memory bank, ii) second current parity data is read from a memory location, corresponding to the first memory location, in a second parity memory bank that corresponds with the first content memory bank, and iii) third current parity data is read from a memory location, corresponding to the first memory location, in a third parity memory bank that corresponds with the first content memory bank. For example, in an embodiment, the memory control device 120 reads i) current row parity data from a memory location, corresponding to the first memory location, in the row parity memory bank 114-1, ii) current column parity data from a memory location, corresponding to the first memory location, in the column parity memory bank 116-1, and iii) current corner parity data from a memory location, corresponding to the first memory location, in the corner parity memory bank 118.

At block 508, old content data, overwritten by the new content data at the first memory location in the first content memory bank, is reconstructed based on the current content data read from the other content memory banks in the set at block 504 and the corresponding parity data read at block 506. In an embodiment, the memory control device 120 reconstructs the old content data by XORing together i) the current content data read from the content memory banks 208-2a, 208-3a, 208-4a, 208-5a, 208-6a, 208-7a, 208-8a and ii) the current row parity data read from the row parity memory bank 214-1.

At block 510, new first (e.g., row) parity data is generated. In an embodiment, the memory control device 120 calculates the new row parity data by XORing together i) the new content data written to the first content memory bank, ii) the reconstructed old parity data, and iii) the current row parity data.

At block 512, new second (e.g., column) parity data is generated. In an embodiment, the memory control device 120 calculates the new column parity data by XORing together i) the new content data written to the first content memory bank, ii) the reconstructed old parity data, and iii) the current column parity data.

At block 514, new third (e.g., corner) parity data is generated. In an embodiment, the memory control device 120 calculates the new corner parity data by XORing together i) the new row parity data, ii) the current row parity data, and iii) the current corner parity data. In another embodiment, the memory control device 120 calculates the new corner parity data by XORing together i) the new column parity data, ii) the current column parity data, and iii) the current corner parity data.

At block 516, first new parity data, second new parity data and third new parity data is written, respectively, to the first parity memory bank, the second parity memory bank and the third parity memory bank. In an embodiment, the memory control device 120 writes i) the new row parity data to the memory location, that correspond to the first memory in the content memory bank 218-1a, in the row parity memory bank 214-1, ii) the new column parity data to the memory location, that correspond to the first memory in the content memory bank 218-1a, in the column parity memory bank 216-1, and iii) the new corner parity data to the memory location, that corresponds to the first memory location, that correspond to the first memory in the content memory bank 218-1a, in the corner parity memory bank 218.

FIGS. 6A-6D are block diagrams illustrating various example scenarios in which multiple memory requests are concurrently (e.g., at least partially in a same clock cycle) serviced in a memory bank system 600 that includes a set of multi-port (e.g., two-port) content memory banks 608, according to embodiments. In an embodiment, the memory system 600 also includes a first set of multi-port (e.g., two-port) parity memory banks 614 (e.g., row parity memory banks), a second set of parity memory banks 616 (e.g., column parity memory banks), and a third parity memory bank 618 (e.g., corner parity memory bank). The corner parity memory bank 618 supports more concurrent memory operations than each of the row parity memory banks 614 and column parity memory banks 616, in an embodiment. For example, whereas each of the row parity memory banks 614 and column parity memory banks 616 is a two-port memory banks that supports up to two concurrent memory operations, the corner memory bank 618 is a four-port memory bank, or a memory bank implemented using flip-flops, to support at least four concurrent memory operations. In an embodiment, the memory system 600 corresponds to the memory system 200 of FIG. 2, and elements illustrated in FIGS. 6A-6D generally correspond with like-numbered elements in memory system 200 of FIG. 2. For ease of illustration, however, whereas the memory bank system 200 is illustrated as having an eight-by-eight grid of content memory banks 208 with corresponding eight row parity memory banks 214 and eight column parity memory banks 216, the memory bank system 600 is illustrated as having four-by-four grid of logical content memory banks 608 with corresponding four row parity memory banks 614 and four column parity memory banks 616, representing logical memory space of the memory system 600. It is noted that the physical memory space of the memory system 600 includes an eight-by-eight grid of physical content memory banks 608, with corresponding eight row parity memory banks 614 and eight column parity memory banks 616, in an embodiment.

Figure 6A:
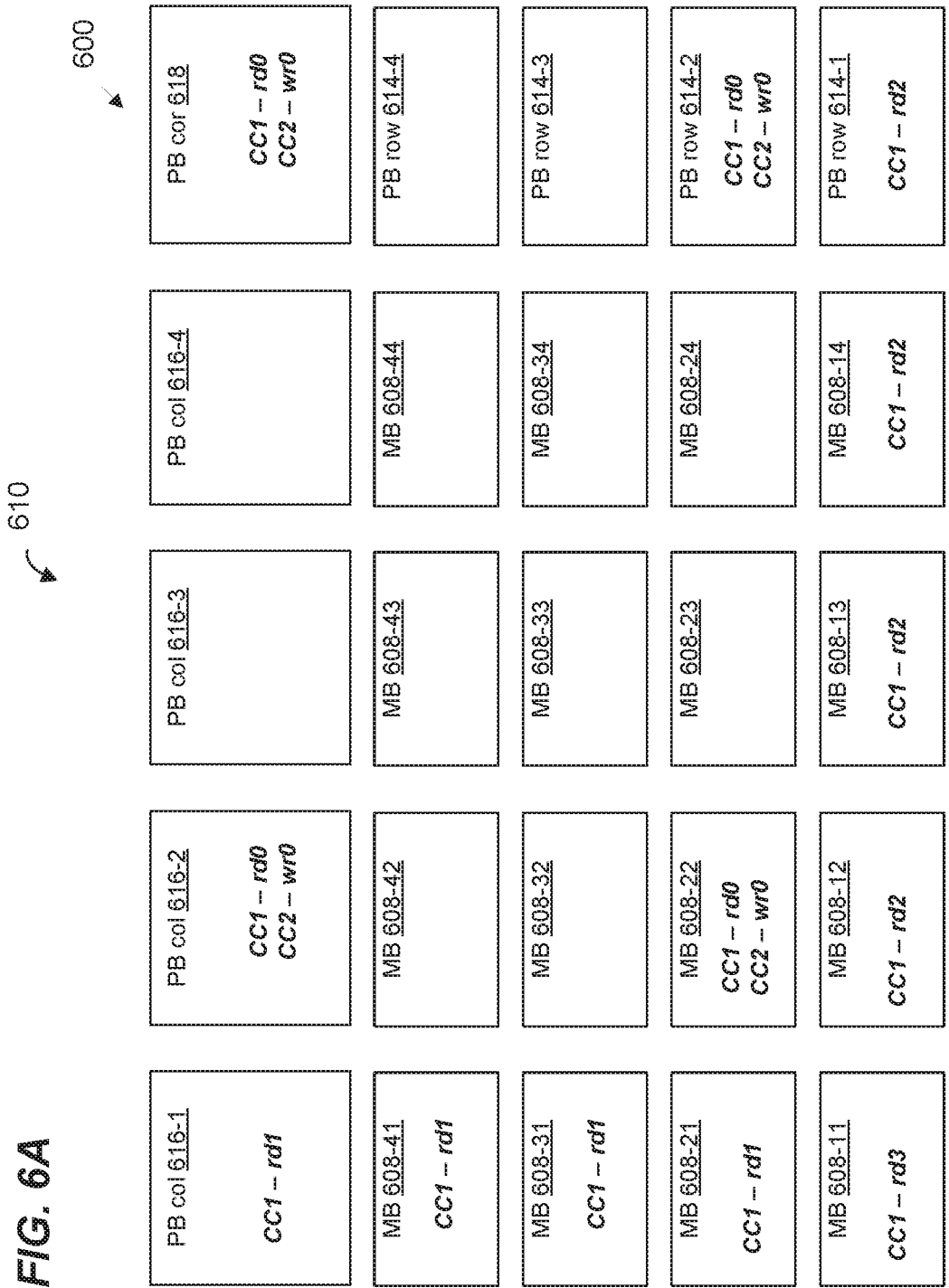

Referring first to a memory operation scenario 610 illustrated in FIG. 6A, the memory control device 120 receives a write request wr0 and three read requests rd1, rd2 and rd3 to be serviced concurrently on the memory system 600. Each of the requests wr0, rd1, rd2, and rd3 indicates a particular logical address in the memory system 600 in which to perform the corresponding memory operation requested by wr0, rd1, rd2, and rd3. The memory control device 120 determines, for each of the read requests rd1, rd2, and rd3, based on the logical address indicated by the read request, a physical address at which the requested content data is stored in the memory system 600. For example, the memory control device 120 accesses a logical-to physical mapping table, such as the logical-to-physical mapping table 300, using the respective logical addresses indicated by the read requests rd1, rd2, rd3 to determine the corresponding physical addresses at which the requested content data is stored in the memory system 600. In the scenario 610, the memory control device 120 determines that the read requests rd1, rd2, rd3 all map to the same content memory bank 608-11.

The memory control device 120 selects a content memory bank 608 in which to service the write request wr0. In an embodiment, the memory control device 120 selects the content memory bank 608 in which to service the write request wr0 from a subset of content memory banks 608 that correspond with i) row parity memory banks 614 other than the row parity memory bank 614 that corresponds with the content memory bank 608-11 in which the content data requested by the read operations r1, r2 and r3 is stored and ii) column parity memory banks 616 other than the column parity memory bank 616 that corresponds with the content memory bank 608-11 in which the content data requested by the read operations r1, r2 and r3 is stored. For example, the memory control device 120 selects the content memory bank 608 in which to service the write request wr0 from a subset of memory banks 608 that are positioned on a diagonal with the content memory bank 608-11. In the embodiment illustrated in FIG. 6A, the memory control device 120 selects a content memory bank 608 in which to service the write request wr0 from a subset of content memory banks 608-22, 608-33, 608-44 (and other content memory banks not illustrated in FIG. 6A) that are positioned on the diagonal that includes the content memory bank 608-11.

In an embodiment, in order to select a content memory bank 608 in which to service the write request wr0, the memory control device 120 identifies, in the subset of memory banks that are positioned on a diagonal with the content memory bank 608-11, one or more content memory banks 608 that have a redundant memory location corresponding to the memory location indicated by the write request wr0, and then selects the content memory bank 608 in which to service the write request wr0 from identified one or more content memory banks 608 that have a redundant memory location. For example, the memory control device 120 identifies the content memory bank 608-22 as a content memory bank that has a redundant memory location corresponding to the memory location indicated by the write request wr0, and selects the content memory bank 608-22 as the content memory bank 208 for servicing the write request wr0, in the illustrated embodiment.

Selecting, for servicing the write request wr0, the content memory bank 608-22 (or another content memory bank 608 that corresponds with i) a row parity memory bank 614 other than the row parity memory bank 614-1 that corresponds with the content memory bank 608-11 and ii) a column parity memory bank 616 other than the column parity memory bank 616-1 that corresponds with the content memory bank 608-11), allows the memory control device 120 to perform memory operations in connection with the write request wr0, including memory operations associated with updating parity data in connection with the write request wr0, without interfering with concurrently performed read operations that are performed in connection with the read requests r1, r2 and r3, and without interfering with any subsequently serviced requests in the memory bank system 600, in an embodiment.

Continuing with the embodiment of FIG. 6A, the memory control device 120 completes memory operations associated with servicing the requests wr0, rd1, rd2, and rd3 in two clock cycles. The memory operations performed in respective content memory banks 608 in a first clock cycle and in a second clock cycle are indicated in FIG. 6A, respectively, by "CC1" and "CC2" followed by an indication of the memory operation being performed in the respective content memory banks 608 during the corresponding clock cycle, and an indication of the request in connection with which the memory operation is being performed. Thus, for example "rd0" indicates that the operation being performed in a read operation and that the read operation is being performed in connection with the write request wr0. As another example, "wr0" indicates that the operation being performed in a write operation and that the write operation is being performed in connection with the write request wr0. As yet another example, "rd1" indicates that the memory operation being performed is a read operation, and that the read operation is being performed in connection with the read request rd1, and so on.

Accordingly, in the first clock cycle, the memory control device 120 performs the following memory operations in connection with the write request wr0: read the current content data from the memory location to which new content data is to be written in MB 608-22, and read the current parity data from the memory locations in each of i) PB row 614-2, ii) PB col 616-2 and iii) PB cor 618. Also during the first clock cycle, the memory control device 120 performs the following memory operations in connection with the read request rd1, so that the content data requested by the read request rd1 can be reconstructed without accessing the content memory bank 608-11: read content data from memory locations corresponding to the memory location requested by the read request rd1 in the content memory banks 608 in the column of which MB 608-11 is a part (i.e., the content memory banks 608-21, 608-31, 608-41 and other content memory banks in the column that are not illustrated in FIG. 6A), and read current parity data from the memory location corresponding to the memory location requested by the read request rd1 in the corresponding column parity memory bank PB col 616-1. Similarly, during the first clock cycle, the memory control device 120 performs the following memory operations in connection with the read request rd2 so that the content data requested by the read request rd2 can be reconstructed without accessing the content memory bank 608-11: read content data from memory locations corresponding to the memory location requested by the read request rd2 in the content memory banks 608 in the row of which MB 608-11 is a part (i.e., the content memory banks 608-12, 608-13, 608-14 and other content memory banks in the row that are not illustrated in FIG. 6A), and read current parity data from the memory location corresponding to the memory location requested by the read request rd2 in the corresponding row parity memory bank PB row 614-1. Additionally, during the first clock cycle, the memory control device 120, in connection with the read request rd3, reads the content data requested by the read request rd3 directly from the memory location corresponding to the memory location indicated by the read request rd3 in the content memory bank 608-11.

Additionally, in an embodiment, the memory control device 120 calculates, during the first clock cycle, in connection with the write request wr0, i) new column parity data to be written to PB col 616-1, ii) new row parity data to be written to PB row 614-1 and iii) new corner parity data to be written to PB cor 618. For example, the memory control device 120 calculates the new column parity data, the new row parity data, and the new corner parity data as described above with reference to FIG. 4. In other embodiments, the memory control device 120 calculates the new column parity data, the new row parity data, and the new corner parity data in other suitable manners. Then, during a second clock cycle (e.g., the clock cycle that immediately follows the first clock cycle), the memory control device 120 writes the new content data to the memory location in MB 608-2 corresponding to the memory location indicated by the write request wr0. Additionally, during the second clock cycle, the memory control device 120 i) write the new column parity data to the memory location in PB col 616-1 corresponding to the memory location in MB 608-22 to which the new content data is written, ii) write the new row parity data to the memory location in PB row 614-1 corresponding to the memory location in MB 608-22 to which the new content data is written, and iii) write the new corner parity data to the memory location in PB cor 618 corresponding to the memory location in MB 608-22 to which the new content data is written. In an embodiment, because the memory banks MB608-22 PB col 616-1, PB row 614-1 and PB cor 618 are multi-port memory banks, the write operations performed in the memory banks MB608-22 PB col 616-1, PB row 614-1 and PB cor 618 do not interfere with other memory operations (e.g., read operations) that may need to be performed in the same memory bank in the second clock cycle. For example, other memory operations (e.g., read operations connected with other requests being serviced during the second clock cycle) are performed in one or more of the MB608-22, PB col 616-1, PB row 614-1 and PB cor 618 concurrently with the write operations being performed during the second clock cycle in connection with wr0, using the other ports of the multi-port memory banks MB608-22, PB col 616-1, PB row 614-1 and PB cor 618.

Figure 6B:
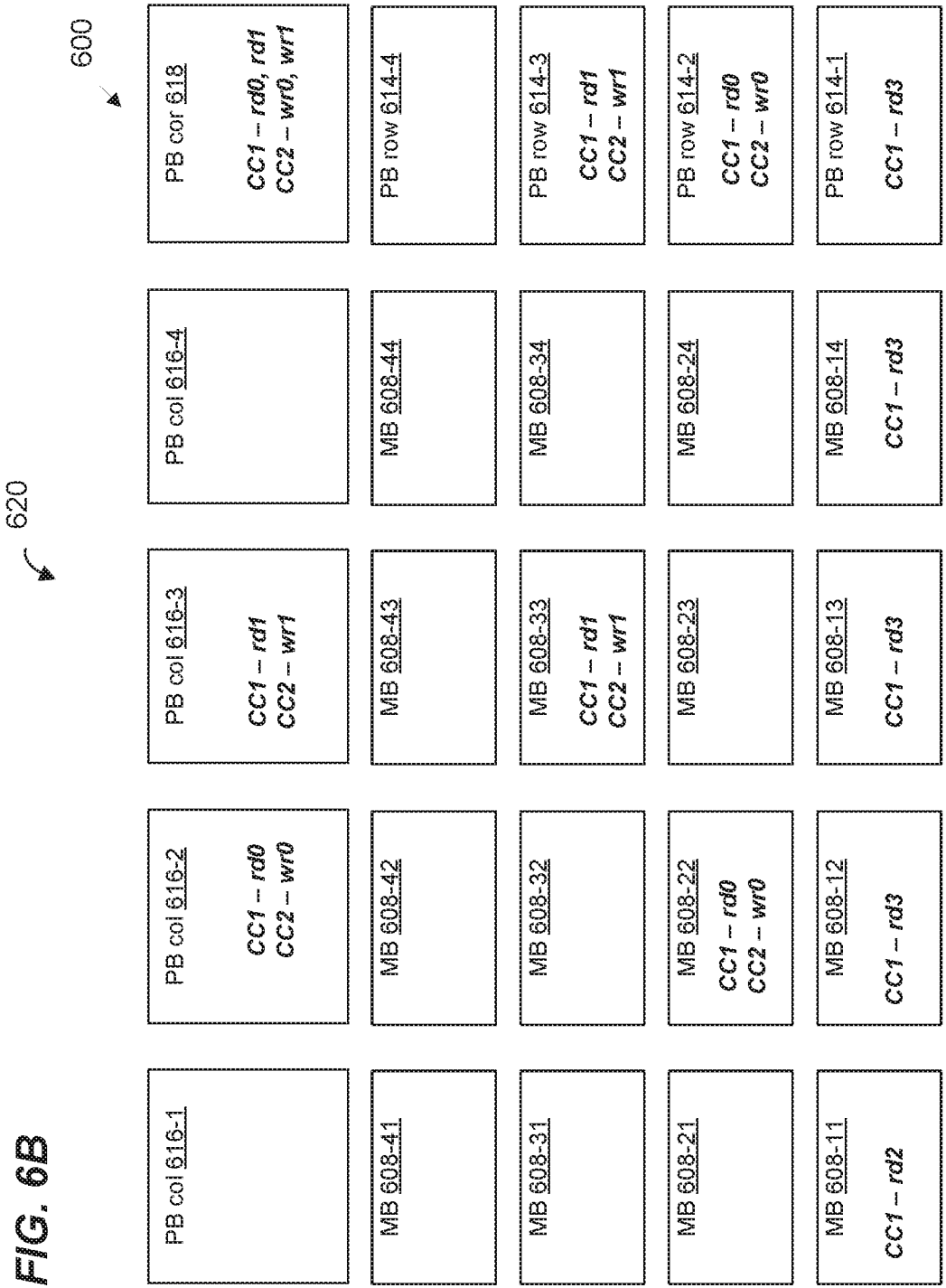

Referring now to a memory operation scenario 620 illustrated in FIG. 6B, the memory control device 120 receives two write request wr0, wr1 and two read requests rd2, rd3 to be serviced concurrently in the memory system 600. Memory operations performed by the memory control device 120 to service the requests wr0, wr1, rd2, and rd3 in the scenario 620 are generally similar to the memory operations performed by the memory control device 120 to service the requests wr0, rd1, rd2, and rd3 in the scenario 610 of FIG. 6A and are the memory operations not described herein in detail for brevity. Similar to the scenario 610 in FIG. 6A, in the scenario 620 the memory control device 120 determines that the two read requests rd2, rd3 map to a particular content memory bank 608 (e.g., MB 608-11) that corresponds with a particular row parity memory bank 614 (e.g., PB row 614-1) and a particular column parity memory bank 616 (PB col 616-1). The memory control device 120 selects respective content memory banks 608 for servicing the write request wr0, wr1 from a set of content memory banks 608 that correspond with parity memory banks 614, 616 different from the parity memory banks 614-1, 616-1 that correspond with the content memory bank 608-11. In an embodiment, the memory control device 120 selects the respective content memory banks for servicing the write requests wr0, wr1 from a set of memory banks 608 that includes memory banks 608 positioned on a same diagonal with the content memory bank 608-11 in the memory system 600. More particularly, the memory control device 120 selects, from the set of memory banks 608 that includes content memory banks 608 positioned on the same diagonal with the content memory bank 608-11 in the memory system 600, respective memory banks 608 that have redundant memory locations corresponding to the memory location requested by the write requests wr0, wr1, in an embodiment. In another embodiment, the memory control device 120 selects the content memory banks 608 for servicing the write requests wr0, wr1, from a set of content memory banks 608 that includes content memory banks 608 that have redundant memory locations corresponding to the memory location requested by the write requests wr0, wr1 and that are positioned on different diagonals in the memory system 600 but that lie, within the different diagonals, in different rows and columns with i) the other content memory banks 608 selected for servicing the other write requests wr0, wr1 and ii) the memory bank 608-11 used in connection with servicing the read requests rd2, rd3. The memory control device 120 then services one of the read requests rd2, rd3 (e.g., rd2) by reading the requested content data directly from the content memory bank 608-11 and services the other one of the read requests read requests rd2, rd3 by reconstructing the requested data in the content memory bank 608-11 based on content data in the corresponding memory locations in the other memory banks in the row (or column) of which the content memory bank 608-11 is a part and the corresponding memory location in the corresponding row parity memory bank 614-1 (or the corresponding column parity memory bank 616-1). Additionally, at least partially concurrently with servicing the read requests rd2, r3, the memory control device 120 services the write requests wr0, wr1 by servicing the write request wr0 in a first one of the selected content memory banks 608 (e.g., MB 608-22 that corresponds with PB row 614-2 and PB col 614-2) and servicing the write request wr1 in a second one of the selected content memory banks 608 (e.g., MB 608-33 that corresponds with PB row 614-3 and PB col 614-3). In an embodiment, servicing the write requests wr0, wr1 includes calculating and writing new parity data to the parity memory banks PB row 614-2, PB col 616-2, PB row 614-3, PB col 616-3, and PB cor 618. In an embodiment, the memory control device 120 implements the method 400 of FIG. 4 to service each of the write requests wr0, wr1. In another embodiment, the memory control device 120 implements a suitable method different from the method 400 of FIG. 4 to service each of the write requests wr0, wr1.

Figure 6C:
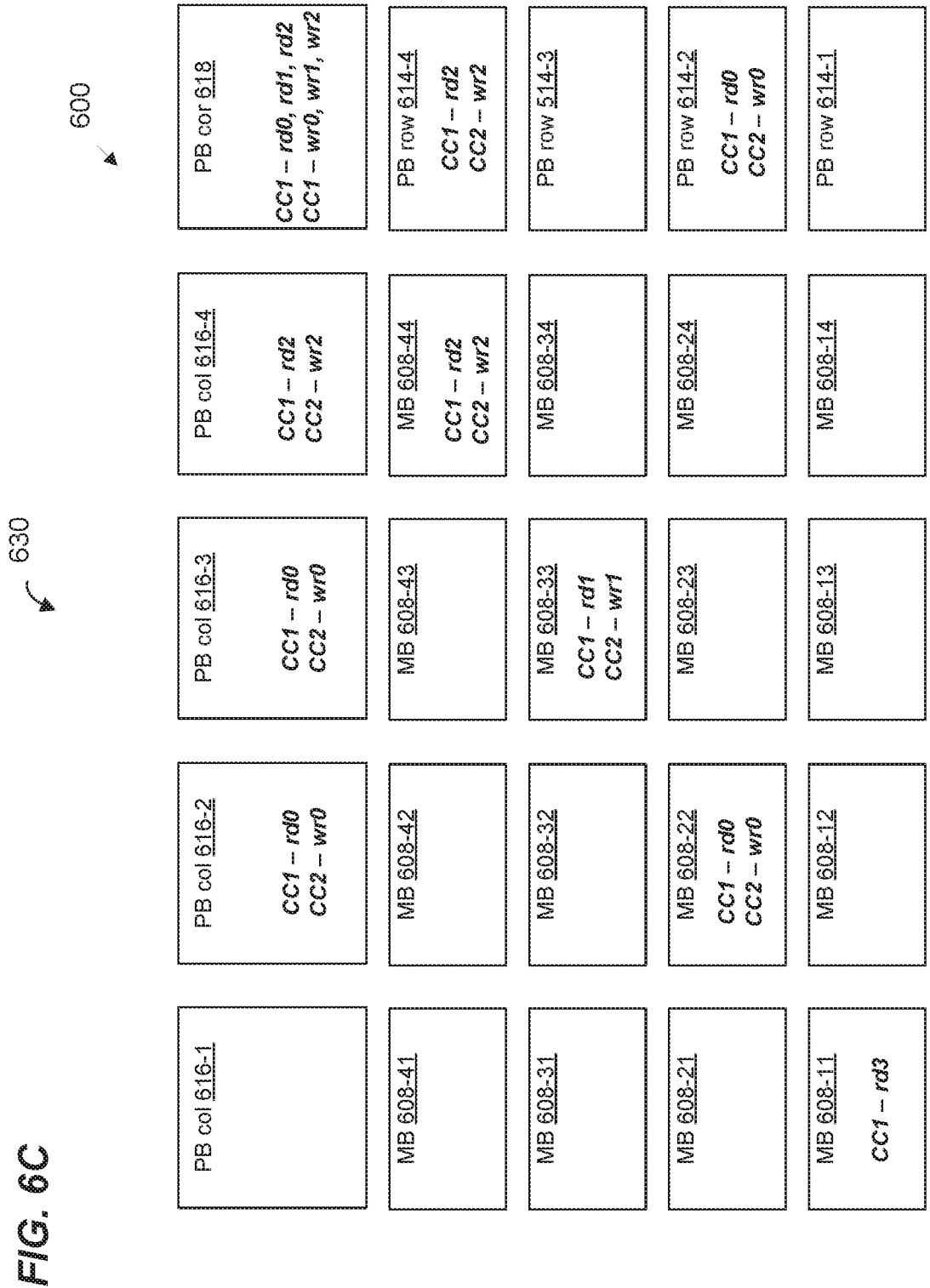

Referring now to a memory operation scenario 630 illustrated in FIG. 6C, the memory control device 120 receives three write request wr0, wr1, wr2 and one read request rd3 to be concurrently serviced in the memory system 600. Memory operations performed by the memory control device 120 to service the requests wr0, wr1, wr2, and rd3 in the scenario 630 are generally similar to the memory operations performed by the memory control device 120 to service the requests wr0, rd1, rd2, and rd3 in the scenario 610 of FIG. 6A and are the memory operations not described herein in detail for brevity. Similar to the scenario 610, in the scenario 630 the memory control device 120 determines that the read request rd3 maps to a particular content memory bank 608 (e.g., MB 608-11) that corresponds with a particular row parity memory bank 614 (e.g., PB row 614-1) and a particular column parity memory bank 616 (PB col 616-1). The memory control device 120 selects respective content memory banks 608 for servicing the write request wr0, wr1, wr3 from a set of content memory banks 608 that correspond with parity memory banks 614, 616 different from the parity memory banks 614-1, 616-1 that correspond with the content memory bank 608-11. In an embodiment, the memory control device 120 selects the respective content memory banks for servicing the write requests wr0, wr1, wr2 from a set of memory banks 608 that includes memory banks 608 positioned on a same diagonal with the content memory bank 608-11 in the memory system 600. More particularly, the memory control device 120 selects, from the set of memory banks 608 that includes content memory banks 608 positioned on the same diagonal with the content memory bank 608-11 in the memory system 600, respective memory banks 608 that have redundant memory locations corresponding to the memory location requested by the write requests wr0, wr1, wr2, in an embodiment. In another embodiment, the memory control device 120 selects the content memory banks 608 for servicing the write requests wr0, wr1, wr2 from a set of content memory banks 608 that includes content memory banks 608 that have redundant memory locations corresponding to the memory location requested by the write requests wr0, wr1, wr2 and that are positioned on different diagonals in the memory system 600 but that lie, within the different diagonals, in different rows and columns with i) the other content memory banks 608 selected for servicing the other write requests wr0, wr1, wr2 and ii) the memory bank 608-11 used in connection with servicing the read request rd3. The memory control device 120 then services the read requests rd3 by reading the requested content data directly from the content memory bank 608-11. Additionally, at least partially concurrently with servicing the read request r3, the memory control device 120 services the write requests wr1, wr2, wr3 by servicing the write request wr0 in a first one of the selected content memory banks 608 (e.g., MB 608-22 that corresponds with PB row 614-2 and PB col 614-2), servicing the write request wr1 in a second one of the selected content memory banks 608 (e.g., MB 608-33 that corresponds with PB row 614-3 and PB col 614-3), and servicing the write request wr3 in a third one of the selected content memory banks 608 (e.g., MB 608-44 that corresponds with PB row 614-4 and PB col 614-4). In an embodiment, servicing the write requests wr0, wr1, wr2 includes calculating and writing new parity data to the parity memory banks PB row 614-2, PB col 616-2, PB row 614-3, PB col 616-3, PB col 614-4, PB col 616-4 and PB cor 618. In an embodiment, the memory control device 120 implements the method 400 of FIG. 4 to service each of the write requests wr0, wr1, wr2. In another embodiment, the memory control device 120 implements a suitable method different from the method 400 of FIG. 4 to service each of the write requests wr0, wr1, wr2.

Referring now to a memory operation scenario 640 illustrated in FIG. 6D, the memory control device 120 receives four write request wr0, wr1, wr2, wr3 to be concurrently serviced in the memory system 600. Memory operations performed by the memory control device 120 to service the requests wr0, wr1, wr2, and wr3 in the scenario 640 are generally similar to the memory operations performed by the memory control device 120 to service the requests wr0, rd1, rd2, and rd3 in the scenario 610 of FIG. 6A and are the memory operations not described herein in detail for brevity. The memory control device 120 selects respective content memory banks 608 for servicing the write request wr0, wr1, wr2, wr3 from a set of content memory banks 608 that includes memory banks 608 that correspond with different ones of the parity memory banks 614, 616. In an embodiment, the memory control device 120 selects the respective content memory banks 608 for servicing the write requests wr0, wr1, wr2, wr3 from a set of memory banks 608 that includes memory banks 608 positioned on a same diagonal. More particularly, the memory control device 120 selects, from the set of memory banks 608 that includes content memory banks 608 positioned on the same diagonal, respective memory banks 608 that have redundant memory locations corresponding to the memory locations requested by the write requests wr0, wr1, wr2, wr3 in an embodiment. In another embodiment, the memory control device 120 selects the content memory banks 608 for servicing the write requests wr0, wr1, wr2, wr3 from a set of content memory banks 608 that includes content memory banks 608 that are positioned on different diagonals in the memory system 600 but that are positioned, within the different diagonals, in different rows and columns with the other content memory banks 608 selected for servicing the other write requests wr0, wr1, wr2, wr3. The memory control device 120 services the write requests wr0, wr1, wr2, wr3 concurrently by servicing the write request wr0 in a first one of the selected content memory banks 608 (e.g., MB 608-11 that corresponds with PB row 614-1 and PB col 616-1), servicing the write request wr1 in a second one of the selected content memory banks 608 (e.g., MB 608-22 that corresponds with PB row 614-2 and PB col 614-2), servicing the write request wr3 in a third one of the selected content memory banks 608 (e.g., MB 608-33 that corresponds with PB row 614-3 and PB col 614-3), and servicing the write request wr3 in a fourth one of the selected content memory banks 608 (e.g., MB 608-44 that corresponds with PB row 614-4 and PB col 616-4). In an embodiment, servicing the write requests wr0, wr1, wr2, wr3 includes calculating and writing new parity data to the parity memory banks PB row 614-1, PB col 616-1, PB row 614-2, PB col 616-2, PB row 614-3, PB col 616-3, PB col 614-4, PB col 616-4 and PB cor 618. In an embodiment, the memory control device 120 implements the method 400 of FIG. 4 to service each of the write requests wr0, wr1, wr2, wr3. In another embodiment, the memory control device 120 implements a suitable method different from the method 400 of FIG. 4 to service each of the write requests wr0, wr1, wr2, wr3.

FIGS. 7A-7C are block diagrams illustrating various example scenarios in which multiple memory requests are concurrently (e.g., at least partially in a same clock cycle) performed in a memory bank system 700 that includes a set of single-port content memory banks 708, according to embodiments. In an embodiment, the memory system 700 also includes a first set of multi-port (e.g., two-port) parity memory banks 714 (e.g., row parity memory banks), a second set of parity memory banks 716 (e.g., column parity memory banks), and a third parity memory bank 718 (e.g., corner parity memory bank). The corner parity memory bank 718 supports more concurrent memory operations than each of the row parity memory banks 714 and column parity memory banks 716, in an embodiment. For example, whereas each of the row parity memory banks 714 and column parity memory banks 716 is a two-port memory banks that supports up to two concurrent memory operations, the corner memory bank 718 is a four-port memory bank, or a memory bank implemented using flip-flops, to support at least four concurrent memory operations. In an embodiment, the memory system 700 corresponds to the memory system 200 of FIG. 2, and elements illustrated in FIGS. 7A-7C generally correspond with like-numbered elements in FIG. 2. For ease of illustration, however, whereas the memory bank system 200 is illustrated as having an eight-by-eight grid of content memory banks 208 with corresponding eight row parity memory banks 214 and eight column parity memory banks 216, the memory bank system 700 is illustrated as having four-by-four grid of logical content memory banks 708 and corresponding four row parity memory banks 714 and four column parity memory banks 716, representing logical memory space of the memory system 700. It is noted that the memory system 700 includes an eight-by-eight grid of physical content memory banks 708, with corresponding eight row parity memory banks 714 and eight column parity memory banks 716, in an embodiment.

Referring first to a memory operation scenario 710 illustrated in FIG. 7A, the memory control device 120 receives two write request wr0, wr1 and two read requests rd2 and rd3 to be serviced concurrently in the memory system 700. Each of the requests wr0, wr1, rd2, rd3 indicates a particular logical address in the memory system 700 in which to perform the corresponding memory operation requested by wr0, wr1, rd2, rd3. The memory control device 120 determines, for each of the read requests rd2, rd3, based on the logical address indicated by the read request rd2, rd3, a logical address at which the requested content data is stored in the memory system 700. For example, the memory control device 120 accesses a logical-to physical mapping table, such as the logical-to-physical mapping table 300 of FIG. 3, using the respective logical addresses indicated by the read requests rd2, rd3 to determine the corresponding physical addresses at which the requested content data is stored in the memory system 700. In the scenario 710, the memory control device 120 determines that the read requests rd2, rd3 map to the same content memory bank 708-11, in the illustrated embodiment.

The memory control device 120 selects respective content memory banks 708 in which to service the write request wr0, wr1. In an embodiment, the memory control device 120 selects the content memory bank 708 in which to service the write requests wr0, wr1 from a subset of content memory banks 708 that correspond with i) row parity memory banks 714 other than the row parity memory bank 714 that corresponds with the content memory bank 708-11 in which the content data requested by the read operations r2, r3 is stored and ii) column parity memory banks 716 other than the column parity memory bank 716 that corresponds with the content memory bank 708-11 in which the content data requested by the read operations r2, r3 is stored. For example, the memory control device 120 selects the respective content memory banks 708 in which to service the write requests wr0, wr1 from a subset of memory banks 708 that are positioned on a diagonal with the content memory bank 708-11, in an embodiment. In the embodiment illustrated in FIG. 7A, the memory control device 120 selects a content memory bank 708 in which to service the write request wr0 from a subset of content memory banks 708-22, 708-33, 708-44 that are positioned on the diagonal that includes the content memory bank 708-11 (and other content memory banks positioned on the same diagonal, not illustrated in FIG. 7A).

In an embodiment, in order to select a content memory banks 708 in which to service the write requests wr0, wr1, the memory control device 120 identifies, in the subset of memory banks that are positioned on a diagonal with the content memory bank 708-11, respective subsets of one or more content memory banks 708 that have redundant memory locations corresponding to the memory location indicated by each of the write request wr0, wr1, and then selects the content memory banks 708 in which to service the write requests wr0, wr1 from the corresponding subsets of content memory banks 708. For example, the memory control device 120 identifies the content memory bank 708-22 as a content memory bank that has a redundant memory location corresponding to the memory location indicated by the write request wr0, and selects the content memory bank 708-22 as the content memory bank 208 for servicing the write request wr0, in an embodiment. Similarly, the memory control device 120 identifies the content memory bank 708-33 as a content memory bank that has a redundant memory location corresponding to the memory location indicated by the write request wr1, and selects the content memory bank 708-33 as the content memory bank 708 for servicing the write request wr0, in an embodiment.

Selecting, for servicing the write request wr0, wr1 the content memory banks 708-22, 708-3, or other content memory banks 708 that correspond with i) row parity memory banks 714 other than the row parity memory bank 714-1 that corresponds with the content memory bank 708-11 and ii) column parity memory banks 716 other than the column parity memory bank 716-1 that corresponds with the content memory bank 708-11, allows the memory control device 120 to perform memory operations in connection with the write requests wr0, wr1, including memory operations associated with updating parity data in connection with the write requests wr0, wr1, without interfering with concurrently performed operations in connection with the read requests r2, r3, any without interfering with servicing any subsequent requests in the memory system 700, in an embodiment.

Continuing with the scenario 710 of FIG. 7A, the memory control device 120, completes memory operations associated with servicing the requests wr0, wr1, rd2, and rd3 in two clock cycles, in the illustrated embodiment. The memory operations performed in respective content memory banks 708 in a first clock cycle and in a second clock cycle are indicated in FIG. 7A, respectively, by "CC1" and "CC2" followed by an indication of the memory operation being performed in the respective content memory banks 708 during the corresponding clock cycle, and an indication of the request in connection with which the memory operation is being performed. Thus, for example "rd0" indicates that the operation being performed in a read operation and that the read operation is being performed in connection with the write request wr0. As another example, "wr0" indicates that the operation being performed in a write operation and that the write operation is being performed in connection with the write request wr0. As yet another example, "rd1" indicates that the memory operation being performed is a read operation, and that the read operation is being performed in connection with the read request rd1, and so on. In an embodiment, the memory control device 120 implements the method 500 of FIG. 5 to service each of the write requests wr0, wr1. In another embodiment, the memory control device 120 implements a suitable method different from the method 500 of FIG. 5 to service each of the write requests wr0, wr1.

Referring now to a memory operation scenario 720 illustrated in FIG. 7B, the memory controller device 120 receives three write request wr0, wr1, wr2 and one read request rd3 to be concurrently services in the memory system 700. The memory control device 120 determines that the read request rd3 maps to a particular content memory bank 708 (e.g., MB 708-11) that corresponds with a particular row parity memory bank 714 (e.g., PB row 714-1) and a particular column parity memory bank 716 (PB col 716-1). The memory control device 120 selects respective content memory banks 708 for servicing the write request wr0, wr1, wr3 from a set of content memory banks 708 that correspond with parity memory banks 714, 716 different from the parity memory banks 714-1, 716-1 that correspond with the content memory bank 708-11. In an embodiment, the memory control device 120 selects the respective content memory banks for servicing the write requests wr0, wr1, wr2 from a set of memory banks 708 that includes memory banks 708 positioned on a same diagonal with the content memory bank 708-11 in the memory system 700. More particularly, the memory control device 120 selects, from the set of memory banks 708 that includes content memory banks 708 positioned on the same diagonal with the content memory bank 708-11 in the memory system 700, respective memory banks 708 that have redundant memory locations corresponding to the memory location requested by the write requests wr0, wr1, wr2, in an embodiment. In another embodiment, the memory control device 120 selects the content memory banks 708 for servicing the write requests wr0, wr1, wr2 from a set of content memory banks 708 that includes content memory banks 708 that have redundant memory locations corresponding to the memory location requested by the write requests wr0, wr1, wr2 and that are positioned on different diagonals in the memory system 700 but that lie, within the different diagonals, in different rows and columns with i) the other content memory banks 708 selected for servicing the other write requests wr0, wr1, wr2 and ii) the memory bank 708-11 used in connection with servicing the read request rd3. The memory control device 120 then services the read requests rd3 by reading the requested content data directly from the content memory bank 708-11. Additionally, at least partially concurrently with servicing the read request r3, the memory control device 120 services the write requests wr1, wr2, wr3 by servicing the write request wr0 in a first one of the selected content memory banks 708 (e.g., MB 708-22 that corresponds with PB row 714-2 and PB col 716-2), servicing the write request wr1 in a second one of the selected content memory banks 708 (e.g., MB 708-33 that corresponds with PB row 714-3 and PB col 716-3), and servicing the write request wr3 in a third one of the selected content memory banks 708 (e.g., MB 708-44 that corresponds with PB row 714-4 and PB col 716-4). In an embodiment, servicing the write requests wr0, wr1, wr2 includes calculating and writing new parity data to the parity memory banks PB row 714-2, PB col 716-2, PB row 714-3, PB col 716-3, PB col 716-4, PB col 716-4 and PB cor 718. In an embodiment, the memory control device 120 implements the method 500 of FIG. 5 to service each of the write requests wr0, wr1, wr2. In another embodiment, the memory control device 120 implements a suitable method different from the method 500 of FIG. 5 to service each of the write requests wr0, wr1, wr2.

Referring now to a memory operation scenario 730 illustrated in FIG. 7C, the memory control device 120 receives four write request wr0, wr1, wr2, wr3 to be concurrently serviced in the memory system 700. The memory control device 120 selects respective content memory banks 708 for servicing the write request wr0, wr1, wr2, wr3 from a set of content memory banks 708 that includes memory banks 708 that correspond with different ones of the parity memory banks 714, 716. In an embodiment, the memory control device 120 selects the respective content memory banks 708 for servicing the write requests wr0, wr1, wr2, wr3 from a set of memory banks 708 that includes memory banks 708 positioned on a same diagonal. More particularly, the memory control device 120 selects, from the set of memory banks 708 that includes content memory banks 708 positioned on the same diagonal, respective memory banks 708 that have redundant memory locations corresponding to the memory location requested by the write requests wr0, wr1, wr2, wr3 in an embodiment. In another embodiment, the memory control device 120 selects the content memory banks 708 for servicing the write requests wr0, wr1, wr2, wr3 from a set of content memory banks 708 that includes content memory banks 708 that are positioned on different diagonals in the memory system 700 but that are positioned, within the different diagonals, in different rows and columns with the other content memory banks 708 selected for servicing the other write requests wr0, wr1, wr2, wr3. The memory control device 120 services the write requests wr0, wr1, wr2, wr3 concurrently by servicing the write request wr0 in a first one of the selected content memory banks 708 (e.g., MB 708-11 that corresponds with PB row 714-1 and PB col 716-1), servicing the write request wr1 in a second one of the selected content memory banks 708 (e.g., MB 708-22 that corresponds with PB row 714-2 and PB col 716-2), servicing the write request wr3 in a third one of the selected content memory banks 708 (e.g., MB 708-33 that corresponds with PB row 714-3 and PB col 716-3), and servicing the write request wr3 in a fourth one of the selected content memory banks 708 (e.g., MB 708-44 that corresponds with PB row 714-4 and PB col 716-4). In an embodiment, servicing the write requests wr0, wr1, wr2, wr3 includes calculating and writing new parity data to the parity memory banks PB row 714-1, PB col 716-1, PB row 714-2, PB col 716-2, PB row 714-3, PB col 716-3, PB col 716-4, PB col 716-4 and PB cor 718. In an embodiment, the memory control device 120 implements the method 500 of FIG. 5 to service each of the write requests wr0, wr1, wr2, wr3. In another embodiment, the memory control device 120 implements a suitable method different from the method 500 of FIG. 5 to service each of the write requests wr0, wr1, wr2, wr3.

Although methods and apparatus described above were in the context of generating parity data using XOR, in other embodiments, other suitable ECCs are utilized. For example, referring to FIG. 1, in an embodiment, parity data in a particular memory location in a particular row parity memory bank 114 is calculated by applying a Reed-Solomon code to content data in corresponding memory locations in the content memory banks 108 that corresponds with the particular row parity memory bank 114. Thus, in an embodiment, content data in the particular memory location in of one of the content memory banks in the row can be reconstructed by applying a Reed-Solomon decoding operation to i) content data in the corresponding memory locations in the other ones of the content memory banks in the row, and ii) parity data in the particular memory location in the row parity memory bank 114.

Referring again to FIG. 1, in some embodiments, the memory device 100 supports oversubscription by accepting more than four requests to be serviced in a same clock cycle. The additional requests are serviced by the memory device 100 in the clock cycle if servicing the additional requests does not interfere with servicing the maximum of four requests, in an embodiment. For example, the additional requests are serviced by the memory device 100 in the clock cycle if the additional requests are directed to content memory banks that are not being used in connection with servicing the maximum four requests, as described above, in the clock cycle. On the other hand, if one or more of the additional requests cannot be serviced in the clock cycle without interfering with servicing the maximum of four requests, the memory device 100 temporarily stores the additional requests and services the additional requests in one or more subsequent clock cycle. For example, the memory device 100 includes a write first input first output (FIFO) queue (not shown) and a read first input first output (FIFO) queue (not shown), in an embodiment. When the memory device 100 receives a write request that cannot be serviced in the clock cycle, the memory control device places the write request in the write FIFO, in an embodiment. Similarly, when the memory device 100 receives a read request that cannot be serviced in the clock cycle, the memory control device places the read request in the read FIFO, in an embodiment. Subsequently, when the memory device 100 is able to service a write request in a subsequent clock cycle without interfering with other requests serviced in the subsequent clock cycle, the memory device 100 services the write request stored at the head of the write FIFO. Similarly, when the memory device 100 is able to service a read request in a subsequent clock cycle without interfering with other requests serviced in the subsequent clock cycle, the memory device 100 services the read request stored at the head of the read FIFO, in an embodiment. In an embodiment, to prevent overflow of the FIFO, the memory device 100 is configured to generate backpressure signals when the write FIFO and/or the read FIFO are full (or close to being full), and transmit the backpressure signals to the client device to temporarily suspend oversubscription from the client devices.

Figure 8:
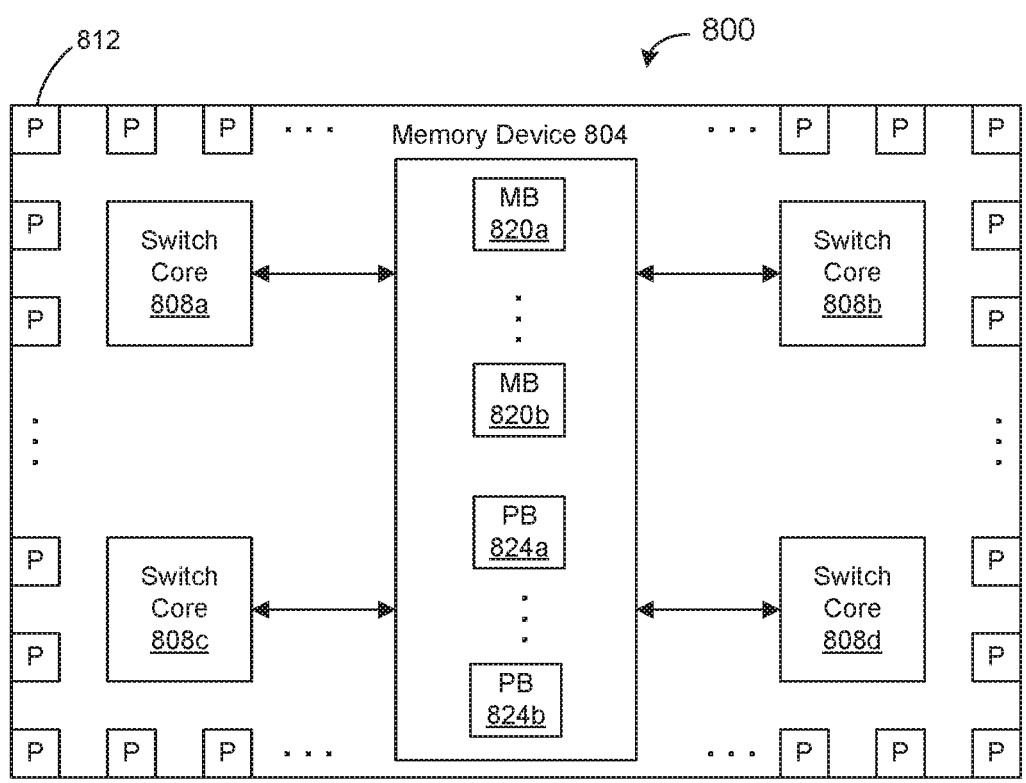
FIG. 8 is a block diagram of an example network device including a shared access memory, according to an embodiment.

FIG. 8 is a block diagram of an example multi-core network device 800, such as a Layer-2 and/or Layer-3 switch, according to an embodiment. The network device 800 includes a memory device 804 coupled to and utilized by multiple packet processing cores 808, also referred to herein as switch cores or switching cores, as will be described in more detail below. The network device 800 also includes a plurality of ports 812, and each port 812 is coupled to a respective communication link associated with one or more communication networks. The packet processing cores 808 are configured to process packets received via the ports 812 and to determine respective ports 812 via which the packets should be subsequently transmitted, in an embodiment.

The packet processing cores 808 utilize one or more control tables, such as a forwarding database table, that are stored in the memory device 804 and are shared by the processing cores 808, in an embodiment. Because the packet processing cores 808 operate in parallel, two or more of the cores 808 may need to perform memory operations on a same portion of the memory device 804 simultaneously, for example to perform simultaneous read operations to obtain forwarding information for packets that come from, or that are destined for, the same address.

The memory device 804 includes a first set of memory banks 820 to store content data, such as one or more control tables, in an embodiment. The memory device 804 also includes a second set of one or more memory banks 824 to store redundancy information associated with content data stored in the first set of memory banks 820. When the memory device 804 simultaneously receives (e.g., during a same clock cycle of the memory device 804) multiple requests to perform memory operations in one of the memory banks 820, the memory device 804 is configured to determine that one or more of the multiple requests is blocked from accessing the one memory bank 820, in an embodiment. In response to determining that one or more of the multiple requests was blocked from accessing the one memory bank 820, the memory device 804 is configured to access parity data from one or more of the parity memory banks 824 and to reconstruct data stored in the one memory bank 820 using the parity data and without using data stored in the one memory bank 820. One of the requested memory operations is performed using data stored in the one memory bank 820. On the other hand, another one of the requested memory operations is performed without accessing the one memory bank 820 and based on the data reconstructed using the parity data from the one or more of the parity memory banks 824, in an embodiment.

In the network device 800, each packet processing core 808 generally acts as a client that generates requests to perform memory operations in one or more memory banks 820 of the memory device 804. The term "client," as used herein, refers to a device configured to generate requests to perform memory operations in one or more memory banks of a memory device. In an embodiment in which a packet processing core 808 includes multiple devices (e.g., circuits) each configured to generate requests to perform memory operations in one or more memory banks 820 of the memory device 804, then the packet processing core 808 includes or acts as multiple clients. For example, in an embodiment in which a packet processor includes a pipeline with a plurality of pipeline stages, and multiple pipeline stages are configured to generate requests to perform memory operations in one or more memory banks of a memory device, the packet processor includes or acts as multiple clients. As another example, a single processor or single pipeline stage is configured to generate simultaneously multiple memory access requests, and thus the single processor or single pipeline stage includes or acts as multiple clients.

In an embodiment, the memory device 804 is a solid-state memory device. For example, the memory device 804 is included on an integrated circuit (IC) or other solid-state device. In an embodiment, the memory device 804 and one or more packet processing cores 808 are included on a single IC. Alternatively, the memory device 804, one or more processing cores and one or more ports are respectively disposed on different ICs that are suitably packaged to operate together as a unified network device.

In various embodiments, the memory device 804 is configured to service a write request concurrently with one or more other requests by selecting a content memory bank 820 in which to service the write request such that the selected content memory bank 820 corresponds with one or more parity memory banks 824 different from one or more parity memory bank(s) 820 being used in connection with servicing any of the other one or more requests. Selecting a content memory bank 820 in which to service the write request such that the selected content memory bank 820 corresponds with one or more parity memory banks 824 different from the one or more parity memory banks 824 that correspond with the content memory bank(s) 820 used in connection with servicing the other one or more requests allows parity data in the parity memory banks 824 to be updated, based on new content data written to the selected content memory bank 820 without interfering with memory operations performed in connection with the other one or more requests. In another embodiment, the memory device 804 includes the memory device 100 of FIG. 1. In an embodiment, the memory device 804 is configured to implement the method 400 of FIG. 4 to service the write request in the selected content memory bank 820. In another embodiment, the memory device 804 is configured to implement the method 500 of FIG. 5 to service the write request in the selected content memory bank 820.

Although the memory device 804 is discussed above as being included the network device 800, similar memory devices may be utilized in other types of computing systems such as personal computers, servers, mainframes, smart phones, gaming systems, set top boxes, communication equipment, etc. For example, a computing system may include multiple devices (e.g., processors (e.g., central processing units, coprocessors, special-purpose processing units, etc.), circuits, pipeline stages, etc.) that each act as a client with respect to a memory device such as the memory device 804.

Figure 9:
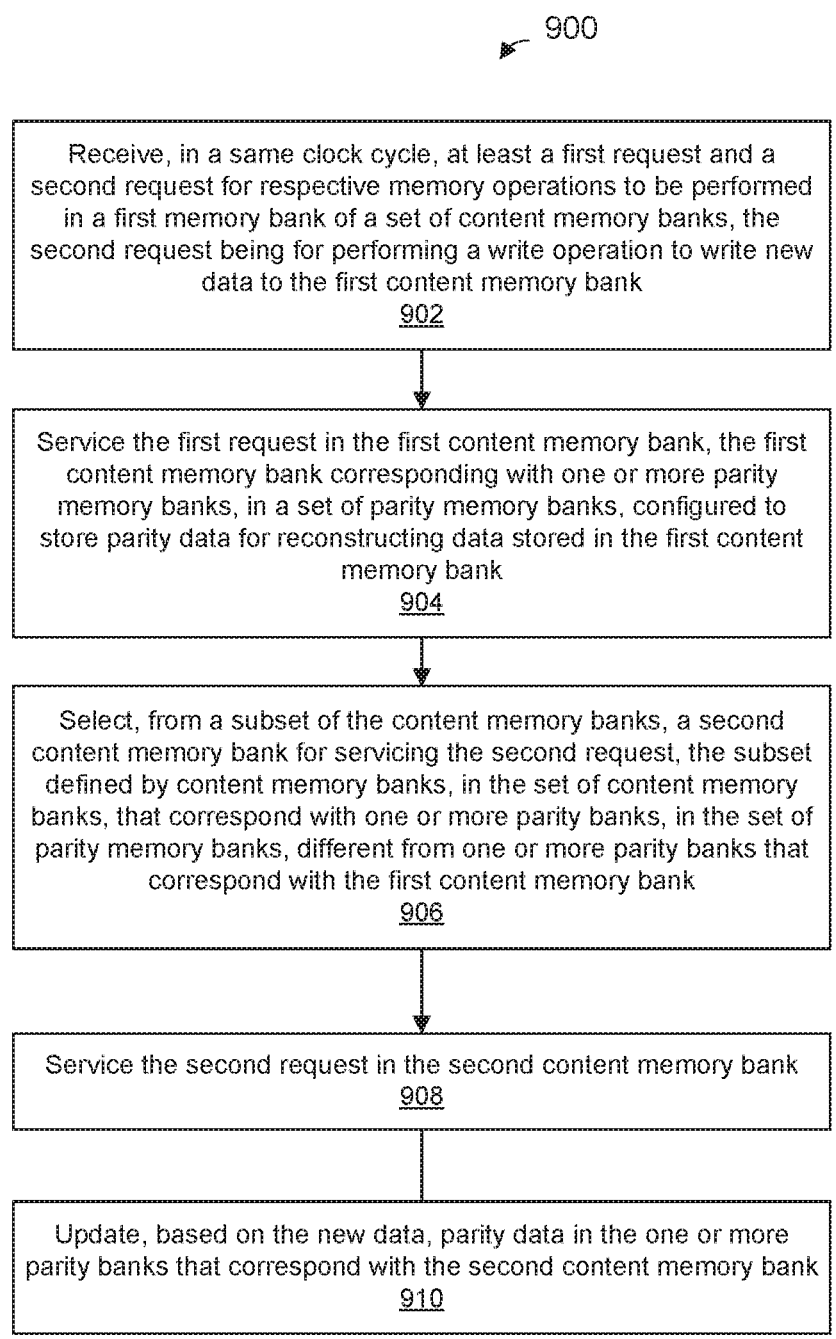
FIG. 9 is a flow diagram of an example method for operating a memory device, according to an embodiment.

FIG. 9 is a flow diagram of a method 900 for servicing multiple requests for performing operations in a memory device that includes a set of content memory banks and a set of parity memory banks, according to an embodiment. The method 900 is implemented in the memory device 100 of FIG. 1, in an embodiment. In other embodiments, the method 900 is implemented in suitable memory devices different from the memory device 100 of FIG. 1. Similarly, the memory device 100 of FIG. 1 implements other suitable methods for performing write operations, in other embodiments.

At block 902, multiple requests for respective memory operations to be performed in a first content memory bank of a set of content memory banks are received in a same clock cycle. In an embodiment, the memory control device 120 of FIG. 1 receives the multiple requests. In another embodiment, a suitable device different from the memory control 120 of FIG. 1 receives the multiple requests. In an embodiment, the multiple requests include at least a first request and a second request, the second request being a write request to write new content data to the first content memory bank.

At block 904, the first request is serviced. In an embodiment, the memory control device 120 services the first request. In another embodiment, a suitable device different from the memory control 120 of FIG. 1 services the first request. In an embodiment, the first request is serviced in the first content memory bank, the first content memory bank corresponding with one or more parity memory banks, in a set of parity memory banks, configured to store parity data for reconstructing data stored in the first content memory bank.

At block 906, a content memory bank for servicing the second request is selected. In an embodiment, the memory control device 120 of FIG. 1 selects the content memory bank for servicing the second request. In another embodiment, a suitable device different from the memory control 120 of FIG. 1 selects the content memory bank for servicing the second request. In an embodiment, the content memory bank is selected from a subset of the set of content memory banks, where the subset is defined by content memory banks, in the set of content memory banks, that correspond with one or more parity memory banks, in the set of parity memory banks, different from one or more parity memory banks that correspond with the first content memory bank.

At block 908, the second request is serviced. In an embodiment, the memory control device 120 services the second request. In another embodiment, a suitable device different from the memory control 120 of FIG. 1 services the second request. In an embodiment, the second request is serviced in the second content memory bank selected at block 906. In an embodiment, servicing the second request includes writing the new content data to a redundant memory location the second content memory bank, the redundant memory location corresponding to a memory location specified by the second request in the first content memory bank.

At block 910, parity data in the one or more parity memory banks that correspond with the second content memory bank is updated based on the new content data written to the new content memory bank.

The various blocks, operations, and techniques described above may be implemented in hardware. When implemented in hardware, the hardware would typically comprise one or more of i) discrete components, ii) one or more integrated circuits, iii) one or more application-specific integrated circuits (ASICs), one or more programmable logic devices (PLDs), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A memory device comprising:
a set of content memory banks configured to store content data, the set of content memory banks comprising a multi-dimensional array of content memory banks;
a set of parity memory banks configured to store parity data for reconstructing content data stored in the set of content memory banks, the set of parity memory banks including a corner parity memory bank that can support more concurrent memory operations than other parity memory bank in the set of parity memory banks can support; and
a memory control device configured to:
in response to receiving, in a first clock cycle, at least (i) a first request from a first client device, the first request requesting a first memory operation to be performed in a first content memory bank of the set of content memory banks, (ii) a second request from a second client device, the second request requesting a second memory operation to be performed in the first content memory bank, the second memory operation being a first write operation to write first new content data, according to a logical address, in the first content memory bank, and (iii) a third request than requests a third memory operation to be performed, the third memory operation being a second write operation to write second new content data,
service the first request, received from the first client device, at least by performing the first memory operation in the first content memory bank,
select, for servicing the second request which is different than the first request, a second content memory bank that corresponds with multiple second parity memory banks different from multiple first parity memory banks that correspond with the first content memory bank, the second content memory bank being positioned on a diagonal of content memory banks, in the multi-dimensional array of content memory banks, that includes the first content memory bank,
service the second request, received from the second client device, at least by, instead of writing the first new content data, according to the logical address, in the first content memory bank, writing the first new content data, in its entirety, to a physical address in the second content memory bank different from the first content memory bank,
service the third request at least by writing the second new content data, in its entirety, to a third content memory bank different from the first content memory bank and the second content memory bank,
in connection with writing the first new content data to the physical address in the second content memory bank, update a mapping table to include information indicating a mapping between the physical address to which the first new content data is written in the second memory bank and the logical address according to which the first new content data was requested to be written in the first content memory bank, and
in a second clock cycle,
update, based on the first new content data written to the second content memory bank, first parity data in the multiple second parity memory banks that correspond with the second content memory bank,
update, based on the first new content data, first corner parity data in the corner parity memory bank, and
update, based on the second new content data, second corner parity data in the corner parity memory bank.

2. The memory device of claim 1, wherein:
the set of content memory banks comprises a two-dimensional grid of content memory banks arranged in rows of content memory banks and columns of content memory banks;
the set of parity memory banks includes (i) respective row parity memory banks corresponding with respective rows of content memory banks, (ii) respective column parity memory banks corresponding with respective columns of content memory banks, and (iii) the corner parity memory bank; and
the memory control device is configured to select the second content memory bank from a subset of content memory banks that are positioned i) in rows different from a row of which the first content memory bank is a part and ii) in columns different from a column of which the first content memory bank is a part.

3. The memory device of claim 2, wherein the memory control device is configured to select the second content memory bank from a subset of memory banks positioned on a diagonal that includes the first content memory bank.

4. The memory device of claim 2, wherein the memory control device is configured to service the second request by writing the first new content data to a redundant memory location at the physical address in the second content memory bank, the redundant memory location corresponding to a memory location that corresponds to the logical address in the first content memory bank to which the second request was directed.

5. The memory device of claim 2, wherein the memory control device is configured to update the mapping table to include information that maps the redundant memory location to which the new content data is written in the second content memory bank to the corresponding memory location in the first content memory bank.

6. The memory device of claim 2, wherein the memory control device is configured to update the parity data by i) writing new row parity data, calculated based in part on the first new content data, to the row parity memory bank that corresponds with the second content memory bank, ii) writing new column parity data, calculated based in part on the first new content data, to the column parity memory bank that corresponds with the second content memory bank, and iii) writing the first corner parity data, calculated in part based on the new row parity data and the new column parity data, to the corner parity memory bank.

7. The memory device of claim 2, wherein the row parity memory banks and the column memory parity memory banks are two-port memory banks that support two concurrent memory operations per clock cycle.

8. The memory device of claim 7, wherein the corner parity memory bank is implemented using flip flops to support four concurrent memory operations per clock cycle.

9. The memory device of claim 8, wherein the memory control device supports servicing four write requests per clock cycle, wherein the memory device is configured to update the parity data at least by writing four new parity data concurrently to four different memory locations in the corner memory bank.

10. The memory device of claim 8, wherein
content memory banks in the set of content memory banks are two-port memory banks, and
the memory control device is configured to,
    in the first clock cycle, read current content data from a memory location to which the first new content data is to be written in the second content memory bank, the current content data to be used for calculating new parity data, and
    in the second clock cycle immediately following the first clock cycle,
        write the first new content data to the memory location in the second content memory bank,
        write new row parity data, calculated based at least in part on i) the current content data read from the memory location in the second content memory bank, ii) the first new content data to be written to the memory location in the second memory bank and iii) current row parity data in a corresponding memory location in the row parity memory bank that corresponds with the second content memory bank, to the row parity memory bank that corresponds with the second content memory bank,
        write new column parity data, calculated based at least in part on i) the current content data read from the memory location in the second content memory bank, ii) the first new content data to be written to the memory location in the second memory bank and iii) current column parity data in a corresponding memory location in the column parity memory bank that corresponds with the second content memory bank to the column parity memory bank that corresponds with the second content memory bank, and
        write new corner parity data, calculated based at least in part on one of i) a) the new row parity data, b) the current row parity data in the corresponding memory location in the row parity memory bank that corresponds with the second content memory bank and c) current corner parity data in a corresponding memory location in the corner parity memory bank and ii) a) the new column parity data, b) the current column parity data in the corresponding memory location in the column parity memory bank that corresponds with the second content memory bank and c) current corner parity data in a corresponding memory location in the corner memory bank, to the corner parity memory bank.

11. The memory device of claim 8, wherein
content memory banks in the set of content memory banks are single-port memory banks, and
the memory control device is configured to,
    in the first clock cycle,
        write the first new content data to a memory location in the second content memory bank; and
        read current content data from corresponding memory locations in content memory banks in a row of content memory banks of which the second content memory bank is a part, the current content data for reconstructing old content data at the memory location in the second content memory banks, and
    in a second clock cycle that immediately follows the first clock cycle,
        write new row parity data, calculated based on i) reconstructed old content data at the memory location in the second content memory bank, ii) the first new content data written to the memory location in the second memory bank and iii) current row parity data in a corresponding memory location in the row parity memory bank that corresponds with the second content memory bank, to the row parity memory bank that corresponds with the second content memory bank,
        write new column parity data, calculated based on i) the reconstructed old content data at the memory location in the second content memory bank, ii) the first new content data written to the memory location in the second memory bank and iii) current column parity data in a corresponding memory location in the row parity memory bank that corresponds with the second content memory bank, to the column parity memory bank that corresponds with the second content memory bank, and
        write new corner parity data, calculated based at least in part on one of i) a) the new row parity data, b) the current row parity data in the corresponding memory location in the row parity memory bank that corresponds with the second content memory bank and c) current corner parity data in a corresponding memory location in the corner parity memory bank and ii) a) the new column parity data, b) the current column parity data in the corresponding memory location in the column parity memory bank that corresponds with the second content memory bank and c) current corner parity data in a corresponding memory location in the corner memory bank, to the corner parity memory bank.

12. A network device, comprising
a plurality of ports configured to couple to one or more networks;
a packet processor configured to process packets received via ones of the plurality of ports; and
a memory device according to claim 1.

13. A method of operating a memory device, the method comprising:
- receiving, at a memory control device in a same clock cycle, multiple requests for performing respective operations in a first content memory bank of a set of content memory banks, the set of content memory banks comprising a multi-dimensional array of content memory banks, wherein receiving the multiple requests includes receiving at least a first request from a first client device, a second request from a second client device, the second request being for performing a first write operation to write first new content data, according to a logical address, in the first content memory bank, and a third request for performing a second write operation to write second new content data,
- servicing, with the memory control device, the first request, received from the first client device, at least by performing the first memory operation in the first content memory bank, the first content memory bank corresponding with multiple first parity memory banks, in a set of parity memory banks, configured to store parity data for reconstructing data stored in the first content memory bank;
- selecting, for servicing the second request which is different than the first request, a second content memory bank that corresponds with multiple second parity memory banks different from the multiple first parity memory banks that correspond with the first content memory bank, the second content memory bank being positioned on a diagonal of content memory banks, in the multi-dimensional array of content memory banks, that includes the first content memory bank;
- servicing, with the memory control device, the second request at least by, instead of writing the first new content data, according to the logical address, to the first content memory bank, writing the first new content data, in its entirety, to a physical address in the second content memory bank;
- servicing, with the memory control device, the third request at least by writing the second new content data, in its entirety, to a third content memory bank different from the first content memory bank and the second content memory bank,
- in connection with writing the first new content data to the physical address in the second content memory bank, updating, with the memory control device, a mapping table to include information indicating a mapping between the physical address to which the first new content data is written in the second memory bank and the logical address according to which the first new content data was requested to be written in the first content memory bank;
- updating, in a second clock cycle with the memory control device based on the first new content data, first parity data in the multiple second parity memory banks that correspond with the second content memory bank;
- updating, in the second clock cycle with the memory control device based on the first new content data, first corner parity data in a corner parity memory bank that can support more concurrent memory operations than other parity memory banks in the set of parity memory banks can support; and
- updating, in the second clock cycle with the memory control device based on the second new content data, second corner parity data in the corner parity memory bank.

14. The method of claim 13, wherein:
- the set of content memory banks comprises a two-dimensional grid of content memory banks arranged in rows of content memory banks and columns of content memory banks;
- the set of parity memory banks includes (i) respective row parity memory banks corresponding with respective rows of content memory banks, (ii) respective column parity memory banks corresponding with respective columns of content memory banks, and (iii) the corner parity memory bank; and
- selecting the second content memory bank comprises selecting the second content memory bank from a subset of content memory banks that are positioned i) in rows different from a row of which the first content memory bank is a part and ii) in columns different from a column of which the first content memory bank is a part.

15. The method of claim 14, wherein selecting the second content memory bank from the subset of content memory banks comprises selecting the second content memory bank from a subset of memory banks positioned on a diagonal that includes the first content memory bank.

16. The method of claim 14, wherein servicing the second request includes writing the first new content data to a redundant memory location at the physical address in the second content memory bank, the redundant memory location corresponding to a memory location that corresponds to the logical address in the first content memory bank to which the second request was directed.

17. The method of claim 14, wherein updating the mapping table comprises updating the mapping table to include information that maps the redundant memory location to which the first new content data is written in the second content memory bank to the corresponding memory location in the first content memory bank.

18. The method of claim 14, wherein updating the first parity data includes i) writing new row parity data, calculated based in part on the first new content data, to the row parity memory bank that corresponds with the second content memory bank, and ii) writing new column parity data, calculated based in part on the first new content data, to the column parity memory bank that corresponds with the second content memory bank; and
- wherein updating the first corner parity data comprises writing new corner parity data, calculated in part based on the new row parity data and the new column parity data, to the corner parity memory bank.

19. The method of claim 14, wherein
- the row parity memory banks and the column memory parity memory banks are two-port memory banks that support two concurrent memory operations per clock cycle, and
- updating, based on the new content data, the first parity data in the one or more parity memory banks that correspond with the second content memory bank includes one or both i) writing new row parity data to a row parity bank using a first one of two ports of the row parity bank and i) writing new column parity data to a column parity bank using a first one of two ports of the column parity bank.

20. The method of claim 19, wherein the corner parity memory bank is implemented using flip flops to support four concurrent memory operations per clock cycle, and
- updating, based on the new content data, the first corner parity includes writing first new corner parity data to the corner parity bank concurrently with writing second new corner parity data to the corner parity bank, the second new corner parity data corresponding to updating the second corner parity data.

21. The method of claim 20, further comprising servicing four write requests per clock cycle, and
updating the first corner parity data includes writing the first new corner parity data concurrently with writing three other new corner parity data to three other memory locations in the corner memory bank.

22. The method of claim 20, wherein:
content memory banks in the set of content memory banks are two-port memory banks;
servicing the second request includes:
in the first clock cycle, reading current content data from a memory location to which the first new content data is to be written in the second content memory bank, the current content data to be used for calculating new parity data, and
in the second clock cycle immediately following the first clock cycle, writing the first new content data to the memory location in the second content memory bank;
updating the first parity data includes, in the second clock cycle immediately following the first clock cycle,
writing first new parity data, including
writing new row parity data, calculated based i) the current content data read from the memory location in the second content memory bank, ii) the first new content data to be written to the memory location in the second memory bank and iii) current row parity data in a corresponding memory location in the row parity memory bank that corresponds with the second content memory bank, to the row parity memory bank that corresponds with the second content memory bank,
writing new column parity data, calculated based i) the current content data read from the memory location in the second content memory bank, ii) the first new content data to be written to the memory location in the second memory bank and iii) current column parity data in a corresponding memory location in the column parity memory bank that corresponds with the second content memory bank to the column parity memory bank that corresponds with the second content memory bank; and
updating the first corner parity data in the corner parity memory bank comprises writing new corner parity data, calculated based at least in part on one of i) a) the new row parity data, b) the current row parity data in the corresponding memory location in the row parity memory bank that corresponds with the second content memory bank and c) current corner parity data in a corresponding memory location in the corner parity memory bank and ii) a) the new column parity data, b) the current column parity data in the corresponding memory location in the column parity memory bank that corresponds with the second content memory bank and c) current corner parity data in a corresponding memory location in the corner memory bank, to the corner parity memory bank.

23. The method of claim 20, wherein:
content memory banks in the set of content memory banks are single-port memory banks;
servicing the second request includes, in the first clock cycle,
writing the first new content data to a memory location in the second content memory bank, and
reading current content data from corresponding memory locations in content memory banks in a row of content memory banks of which the second content memory bank is a part, the current content data for reconstructing old content data at the memory location in the second content memory banks; and
updating the parity data includes, in the second clock cycle immediately following the first clock cycle,
writing new row parity data, calculated based at least in part on i) reconstructed old content data at the memory location in the second content memory bank, ii) the first new content data written to the memory location in the second memory bank and iii) current row parity data in a corresponding memory location in the row parity memory bank that corresponds with the second content memory bank, to the row parity memory bank that corresponds with the second content memory bank; and
writing new column parity data, calculated based at least in part on i) the reconstructed old content data at the memory location in the second content memory bank, ii) the first new content data written to the memory location in the second memory bank, and iii) current column parity data in a corresponding memory location in the column parity memory bank that corresponds with the second content memory bank, to the column parity memory bank that corresponds with the second content memory bank; and
updating the first corner parity data includes, in the second clock immediately following the first clock cycle,
writing new corner parity data, calculated based at least in part on one of i) a) the new row parity data, b) the current row parity data in the corresponding memory location in the row parity memory bank that corresponds with the second content memory bank and c) current corner parity data in a corresponding memory location in the corner parity memory bank and ii) a) the new column parity data, b) the current column parity data in the corresponding memory location in the column parity memory bank that corresponds with the second content memory bank and c) current corner parity data in a corresponding memory location in the corner memory bank, to the corner parity memory bank.

* * * * *